(12) United States Patent
Kusakawa et al.

(10) Patent No.: US 9,853,586 B2
(45) Date of Patent: Dec. 26, 2017

(54) MOTOR DRIVEN APPLIANCE

(71) Applicant: MAKITA CORPORATION, Anjo-shi, Aichi (JP)

(72) Inventors: Takuya Kusakawa, Anjo (JP); Goshi Ishikawa, Anjo (JP); Motohiro Omura, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 7 days.

(21) Appl. No.: 14/801,420

(22) Filed: Jul. 16, 2015

(65) Prior Publication Data

US 2016/0028344 A1 Jan. 28, 2016

(30) Foreign Application Priority Data

Jul. 23, 2014 (JP) ................................. 2014-149769

(51) Int. Cl.
| | | |
|---|---|---|
| *H02P 27/04* | (2016.01) | |
| *H02P 27/06* | (2006.01) | |
| *H02P 29/024* | (2016.01) | |
| *H02J 7/00* | (2006.01) | |

(52) U.S. Cl.
CPC .............. *H02P 27/04* (2013.01); *H02P 27/06* (2013.01); *H02P 29/027* (2013.01); *H02P 29/0241* (2016.02); *H02J 7/0029* (2013.01); *H02J 7/0063* (2013.01)

(58) Field of Classification Search
CPC .................................................. H02P 29/0241
USPC ....................................................... 318/139
See application file for complete search history.

(56) References Cited

U.S. PATENT DOCUMENTS

| | | | | |
|---|---|---|---|---|
| 9,413,088 | B2 * | 8/2016 | Brotto | ..................... B25F 5/021 |
| 2003/0096158 | A1 * | 5/2003 | Takano | ............... H01M 10/482 |
| | | | | 429/90 |
| 2009/0015208 | A1 * | 1/2009 | White | ................. H01M 2/1022 |
| | | | | 320/150 |
| 2010/0237124 | A1 * | 9/2010 | Shima | ...................... B25C 1/06 |
| | | | | 227/8 |
| 2011/0197389 | A1 | 8/2011 | Ota et al. | |

(Continued)

FOREIGN PATENT DOCUMENTS

| | | |
|---|---|---|
| JP | 2006-189321 A | 7/2006 |
| JP | 2011-161602 A | 8/2011 |
| JP | 2013-117473 A | 6/2013 |

*Primary Examiner* — Shawki S Ismail
*Assistant Examiner* — Muhammad S Islam
(74) *Attorney, Agent, or Firm* — Oliff PLC

(57) ABSTRACT

A motor driven appliance comprises a battery, a motor, at least one switch, a control unit, an abnormality detection unit, a determination unit, and a processing unit. The at least one switch comprises an operation switch. The control unit controls driving of the motor by controlling power supply from the battery to the motor when the operation switch is turned on. The abnormality detection unit detects abnormality of the appliance. The determination unit determines whether the detected abnormality is a first type abnormality that can be cleared when the operation switch is switched from on to off, or is a second type abnormality that cannot be cleared even if the operation switch is merely switched from on to off. The processing unit is configured to perform a specific process when it is determined that the detected abnormality is the second type abnormality.

12 Claims, 19 Drawing Sheets

(56) References Cited

U.S. PATENT DOCUMENTS

| | | | | |
|---|---|---|---|---|
| 2011/0304287 | A1* | 12/2011 | Yang | G01R 31/3682 |
| | | | | 318/139 |
| 2011/0309793 | A1* | 12/2011 | Mitsutani | B60K 6/445 |
| | | | | 320/109 |
| 2013/0033233 | A1* | 2/2013 | Noda | H01M 10/44 |
| | | | | 320/134 |
| 2013/0108904 | A1* | 5/2013 | Okabayashi | H01M 10/486 |
| | | | | 429/90 |
| 2013/0314007 | A1* | 11/2013 | Yanagihara | B25F 5/00 |
| | | | | 318/139 |
| 2013/0338866 | A1* | 12/2013 | Ozaki | B60L 3/0061 |
| | | | | 701/22 |

* cited by examiner

FIG.3

| | PROTECTIVE FUNCTION | ERROR TYPE | ERROR RESET CONDITION | ERROR DISPLAY (NOTIFICATION) TIMING |
|---|---|---|---|---|
| BATTERY AS PROTECTION | FIRST OVERLOAD PROTECTION | FIRST BATTERY OVERLOAD | RETRIGGER | — |
| | SECOND OVERLOAD PROTECTION | SECOND BATTERY OVERLOAD | CHARGING BY CHARGER | AS SIGNAL INPUT & CONTINUE INPUT AFTER RETRIGGER |
| | FIRST OVER-DISCHARGE PROTECTION | FIRST BATTERY OVER-DISCHARGE | RETRIGGER | — |
| | SECOND OVER-DISCHARGE PROTECTION | SECOND BATTERY OVER-DISCHARGE | CHARGING BY CHARGER | AS SIGNAL INPUT & CONTINUE INPUT AFTER RETRIGGER |
| | TEMPERATURE PROTECTION | BATTERY HIGH TEMPERATURE | COOLING | AS SIGNAL INPUT & CONTINUE INPUT AFTER RETRIGGER |
| CONTROLLER PROTECTION | OVERLOAD PROTECTION | BODY OVERLOAD | RETRIGGER | — |
| | LOCK PROTECTION | MOTOR LOCK | RETRIGGER | — |
| | OVER-DISCHARGE PROTECTION | BODY OVER-DISCHARGE | RETRIGGER | — |
| | TEMPERATURE PROTECTION | CONTROLLER HIGH TEMPERATURE (*CONTROL CIRCUIT HIGH TEMPERATURE) | COOLING | UPON ERROR DETECTION |

"*": APPLIED IN 2ND EMBODIMENT

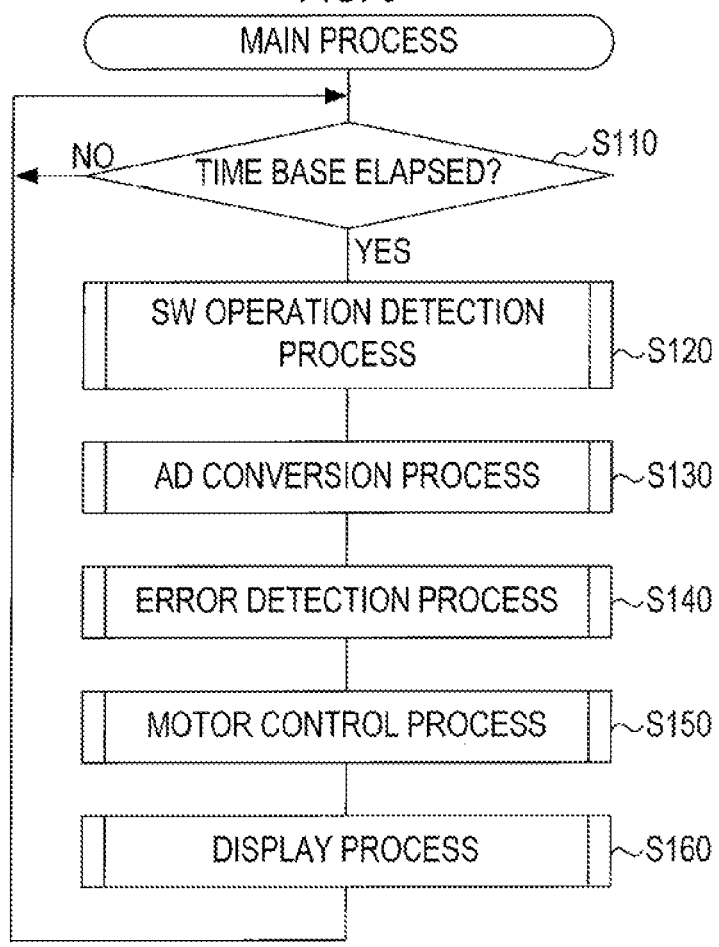

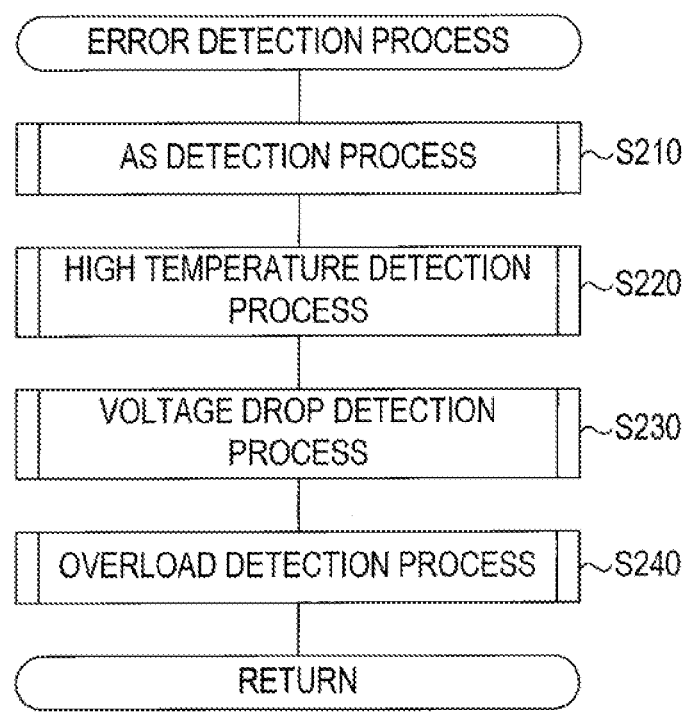

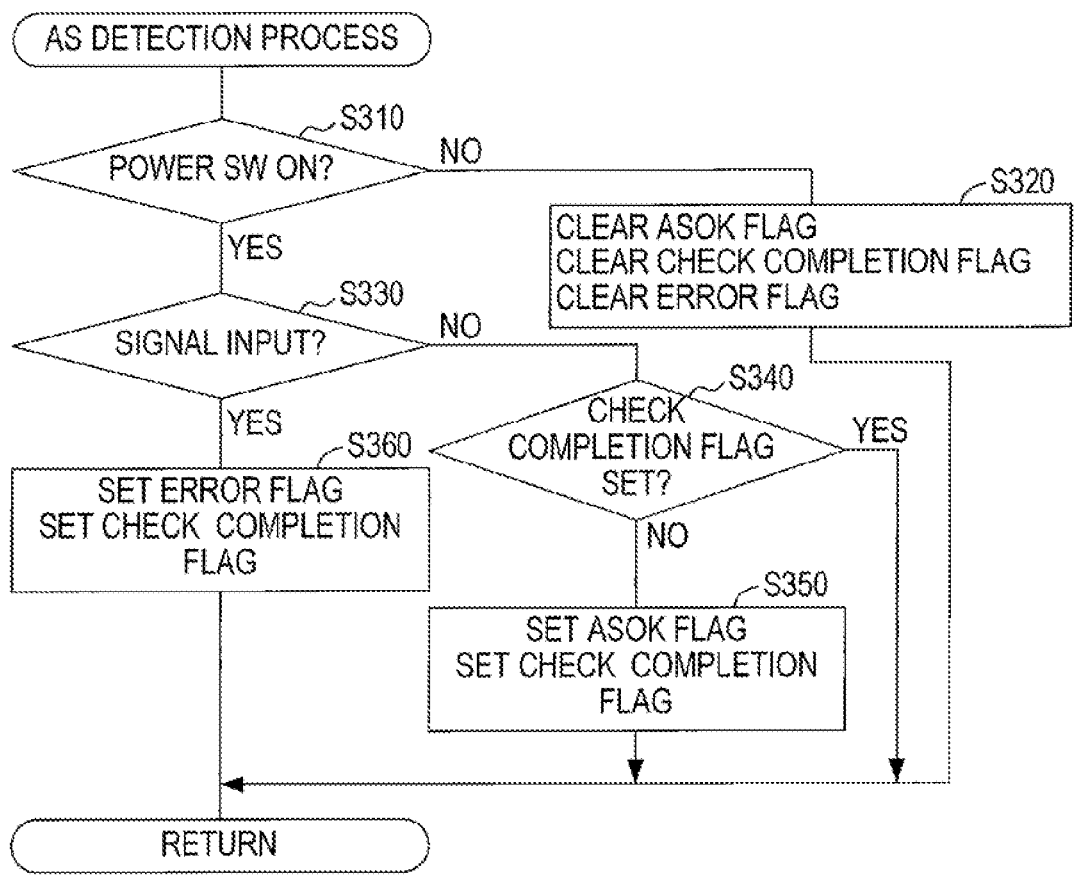

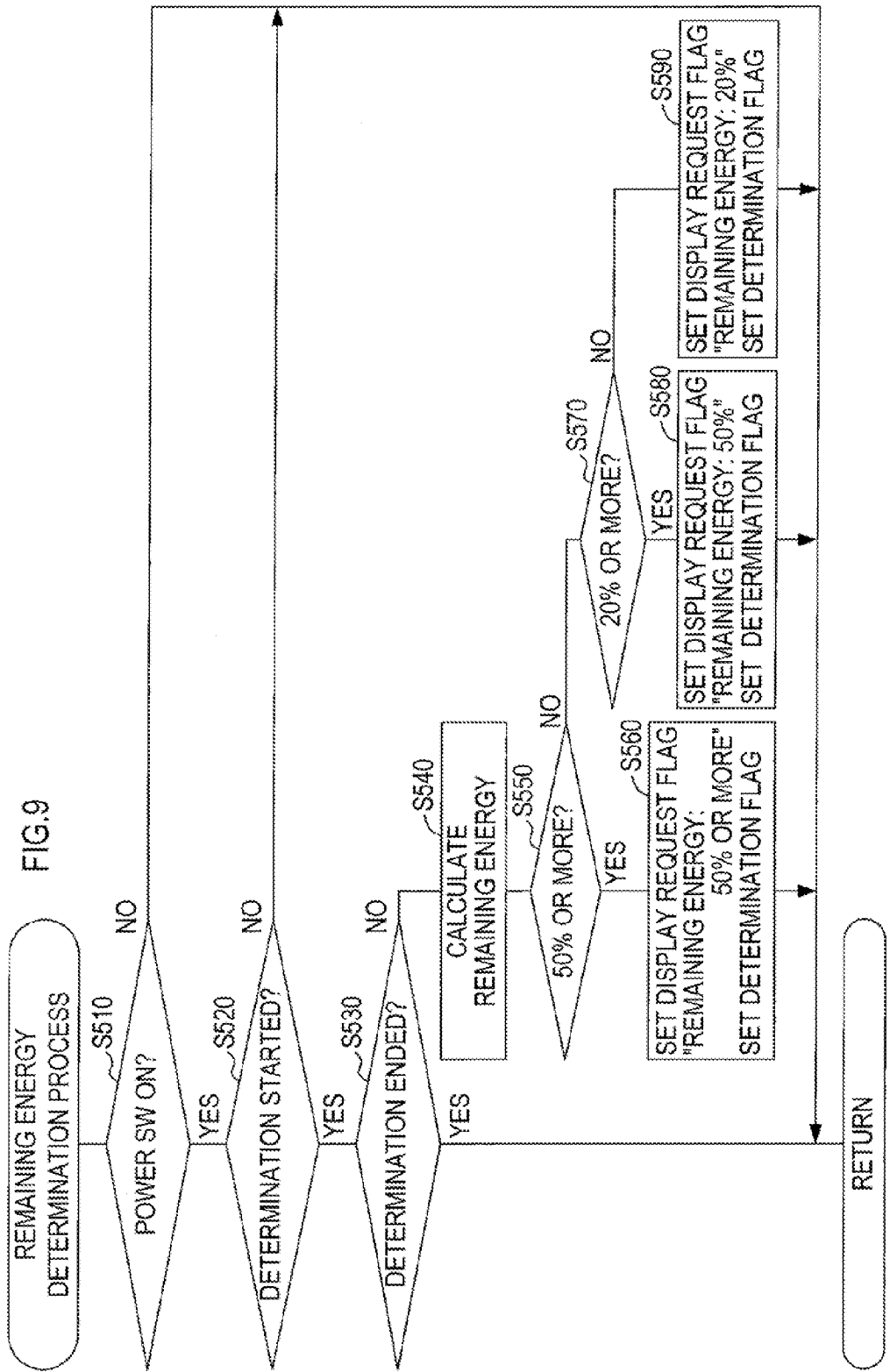

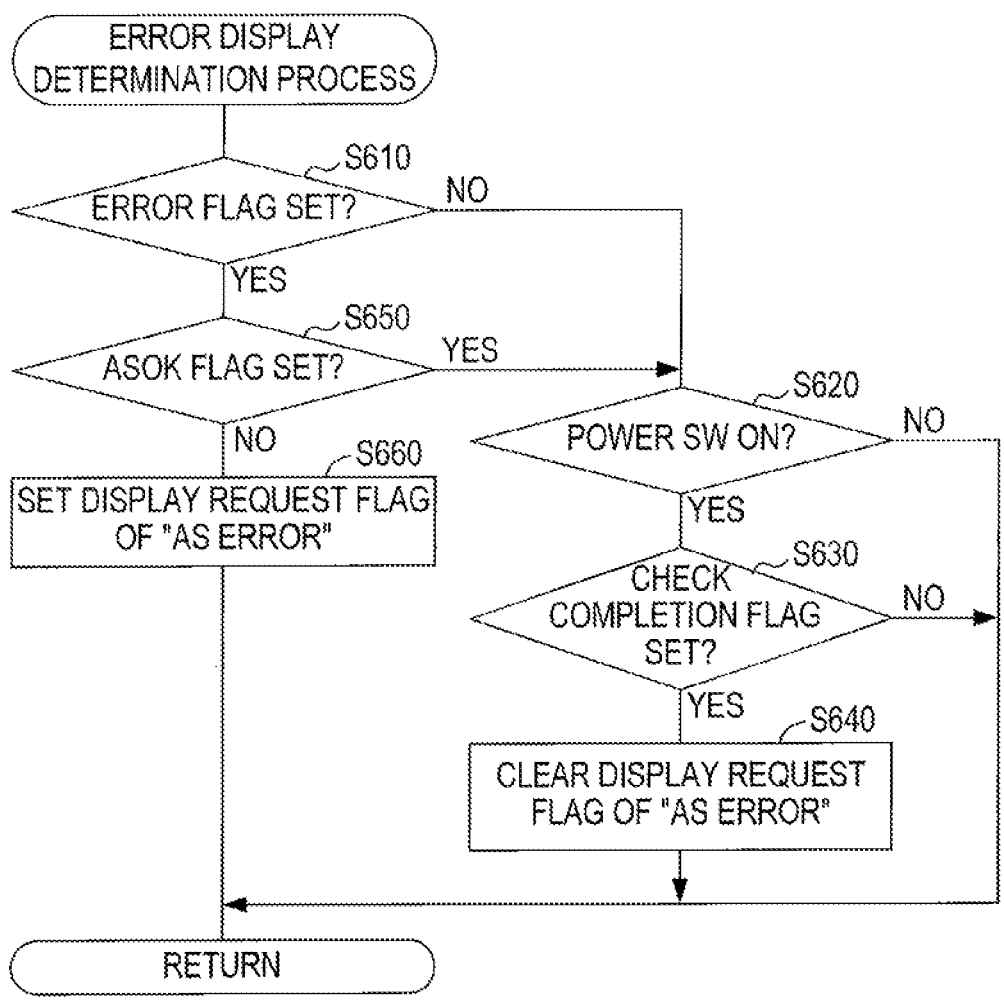

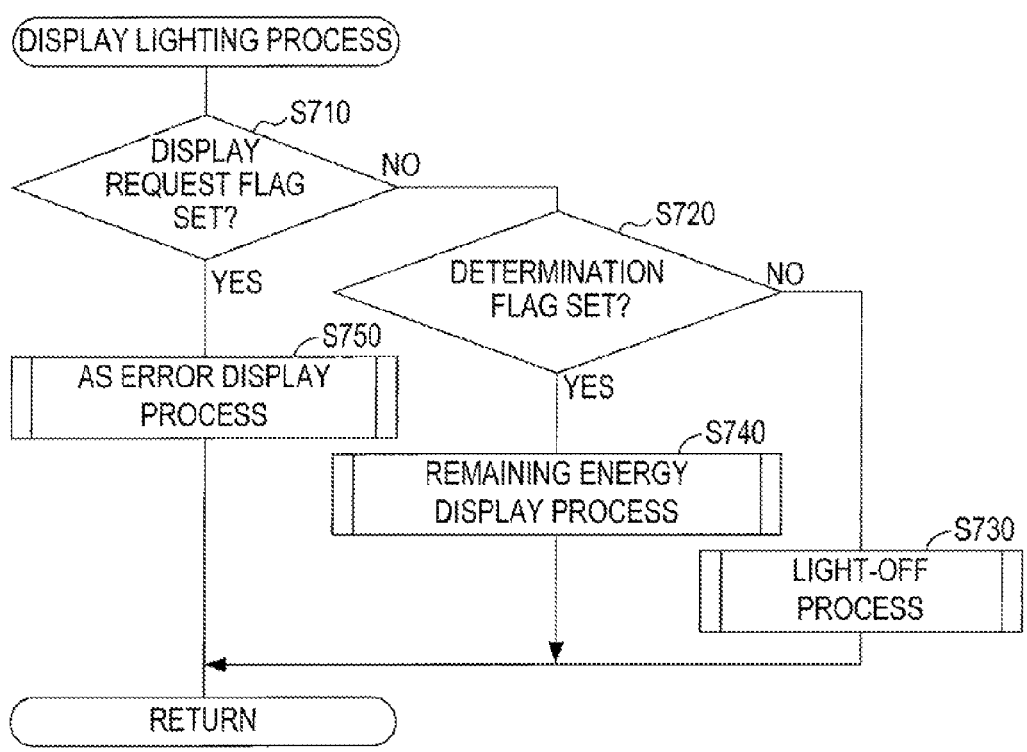

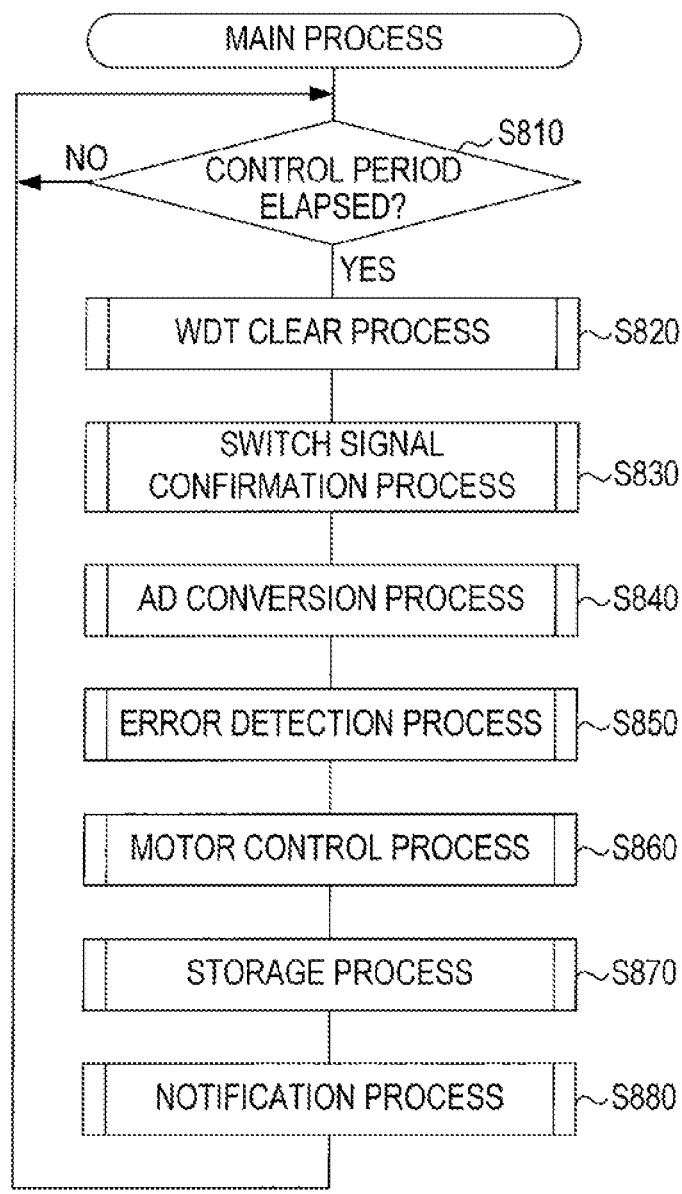

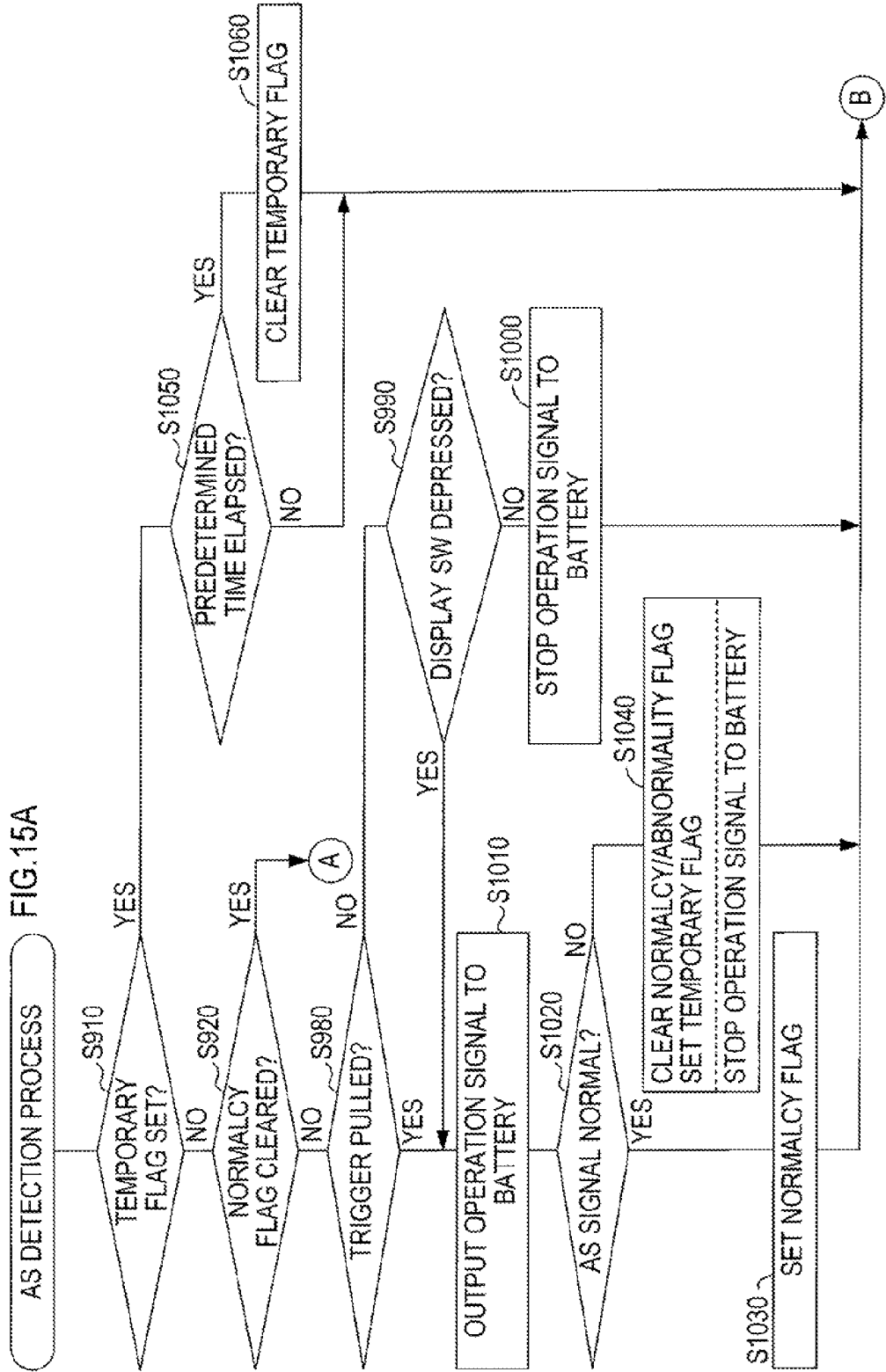

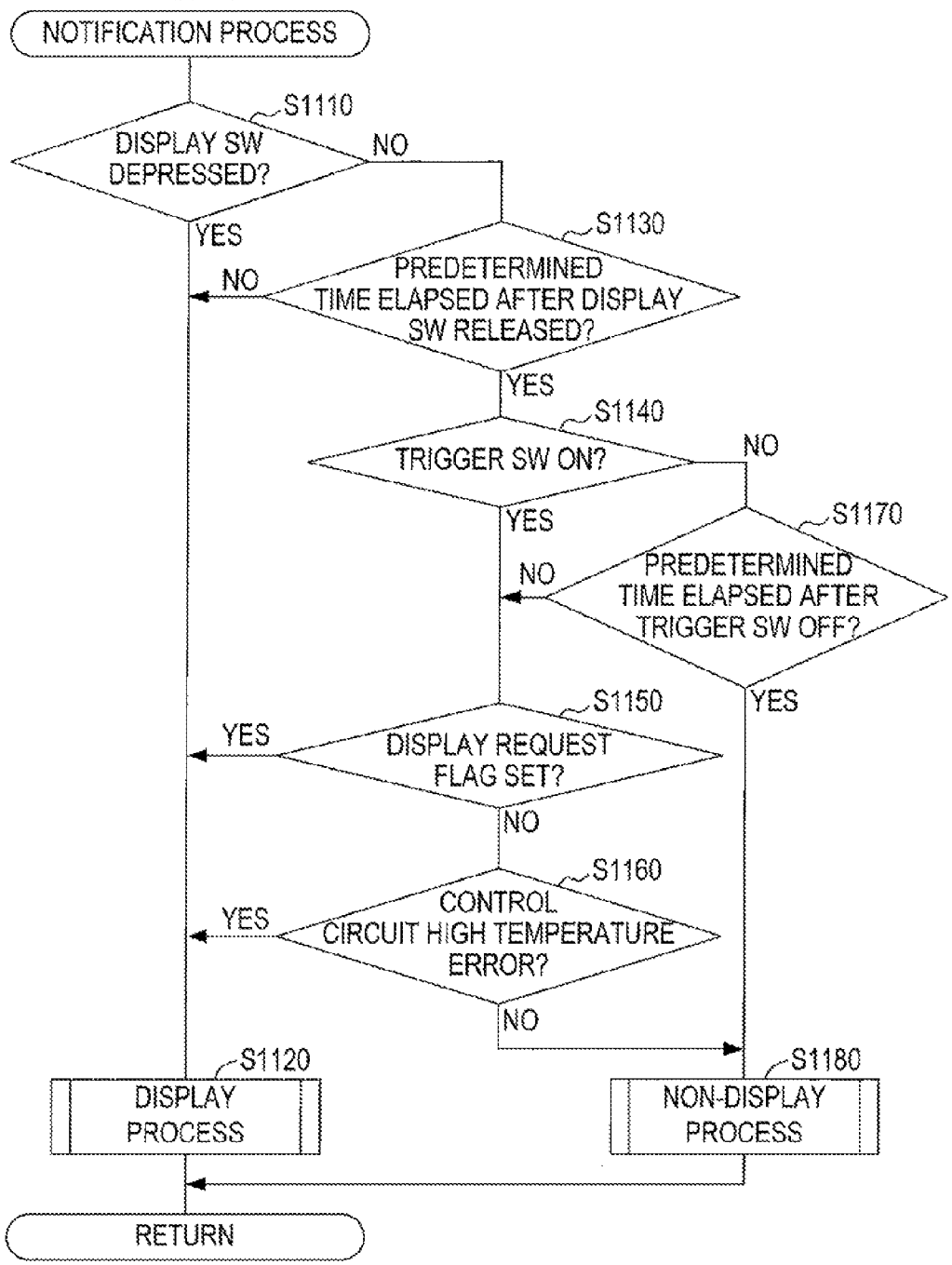

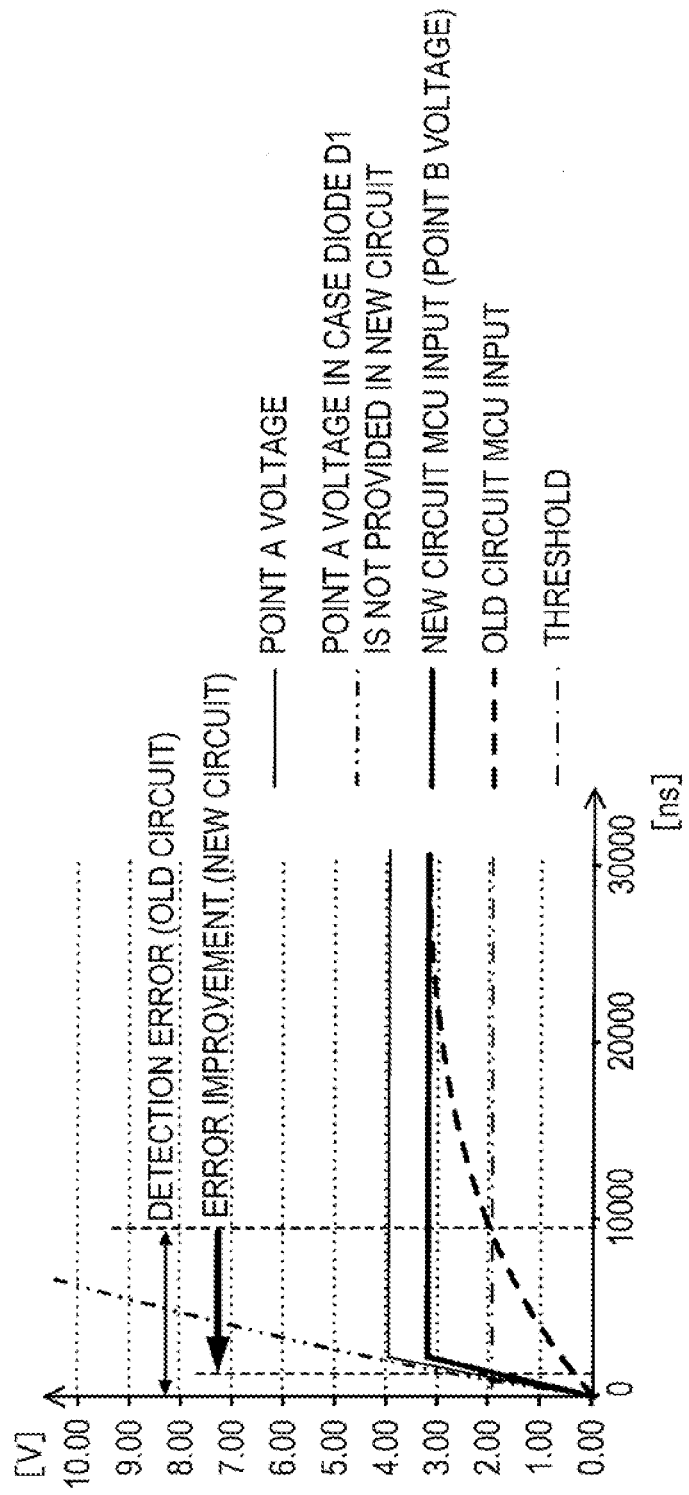

MOTOR DRIVEN APPLIANCE

CROSS-REFERENCE TO RELATED APPLICATIONS

This application claims the benefit of Japanese Patent Application No. 2014-149769 filed Jul. 23, 2014 in the Japan Patent Office, and the entire disclosure of which is incorporated herein by reference.

BACKGROUND

The present disclosure relates to a motor driven appliance operated by a battery.

Some of a variety of motor driven appliances operated by a battery such as, for example, a rechargeable driver drill or a rechargeable grass mower, are provided with a function of detecting and notifying an abnormality. A user using this kind of motor driven appliance, when an abnormality takes place, can acknowledge the abnormality (for example, see Japanese Patent Application Publication No. 2011-161602).

SUMMARY

A potential abnormality which may take place in a motor driven appliance is that, for example, the battery is substantially discharged and needs to be charged, and thus the appliance cannot be used. There is also an abnormality such that, if retrigger meaning to turn off an operation switch once and then turn it on again is performed, the abnormality is cleared and the appliance becomes available again.

If the former abnormality occurs, it is preferable that a user is notified of the abnormality. If the latter abnormality that can be cleared by retrigger occurs, such an abnormality is not necessarily notified because, even if operation of the appliance is stopped by the abnormality, the abnormality is cleared when the user performs retrigger. Rather, if a notification is given each time an abnormality occurs that can be readily cleared by retrigger, the user may feel troublesome. That is, a notification unconditionally given for any abnormalities could result in imposing various burdens on the user for occurrence of the abnormality each time the abnormality is notified. For example, such a notification could puzzle user or force the user to bear a burden of referring to an instruction manual to examine particulars of the abnormality.

Accordingly, in one aspect of the present disclosure, it is desirable that a motor driven appliance is provided that, when detecting an abnormality, can execute an appropriate process in accordance with a type of the abnormality.

A motor driven appliance according to one aspect of the present disclosure comprises a battery, a motor, at least one switch, a control unit, and an abnormality detection unit, a determination unit, and a processing unit.

The motor is driven by electric power of the battery. The at least one switch comprises an operation switch operated to drive the motor. The control unit controls driving of the motor by controlling power supply from the battery to the motor when the operation switch is turned on. The abnormality detection unit detects an abnormality of the motor driven appliance. The determination unit, when an abnormality is detected by the abnormality detection unit, executes an abnormality type determination process of determining whether the detected abnormality is a first type abnormality that can be cleared when the operation switch is switched from on to off, or a second type abnormality that cannot be cleared even if the operation switch is merely switched from on to off. The processing unit is configured to execute a specific process when it is determined that the abnormality detected by the abnormality detection unit is the second type abnormality by the determination unit, and not to execute the specific process when it is determined that the detected abnormality is the first type abnormality.

According to the motor driven appliance according to the one aspect of the present disclosure, the specific process is not necessarily executed when an abnormality is detected. The specific process is executed when the second type abnormality is detected, and is not executed when the first type abnormality is detected. Therefore, it is possible to provide a motor driven appliance that, when detecting an abnormality, can execute an appropriate process in accordance with the type of the abnormality.

The motor can be a drive source for driving elements of the appliance. Also, one or more switches of the at least one switch may be set to be abnormality confirmation switches. The abnormality type determination process may comprise a step of, when the one or more switches set to be the abnormality confirmation switches are turned on and when an abnormality is detected by the abnormality detection unit, determining whether the detected abnormality is the first type abnormality or the second type abnormality.

If an abnormality is detected by the abnormality detection unit while the operation switch is turned on, the control unit may be configured to stop power supply from the battery to the motor even if the operating switch remains turned on.

According to the above configuration, when an abnormality occurs, it is possible to suppress progress of the abnormality. In particular, when the first type abnormality occurs, it is possible to rapidly return to a normal state by stopping power supply to the motor.

At least the operation switch may be set to be the abnormality confirmation switch. In this case, if an abnormality is detected by the abnormality detection unit while the operation switch is turned on and the motor is driven, the determination unit may be able to execute the abnormality type determination process in a state in which the operation switch remains turned on.

According to the above configuration, even if the second type abnormality occurs while the operation switch is turned on and the motor is driven, the motor driven appliance, while the operation switch is turned on (i.e., without turning off the operation switch), can determine that the second type abnormality has occurred and execute the specific process.

The motor driven appliance may comprise an operation signal output unit that outputs an operation signal indicating an operation state of the operation switch to the abnormality detection unit. In that case, each of the abnormality detection unit and the determination unit may be configured as follows. That is, the abnormality detection unit may be configured to output an abnormality detection signal indicating detection of an abnormality, when detecting the abnormality. The abnormality detection unit may be configured to stop the output of the abnormality detection signal, if the abnormality detected by itself is the first type abnormality when the abnormality detection unit acknowledges that the operation switch is switched from on to off based on the operation signal input from the operation signal output unit, after the output of the abnormality detection signal. The determination unit may be configured to execute a pseudo-operation process to cause the operation signal output unit to output an operation signal indicating that the operation switch is turned off, and then output an operation signal indicating that the operation switch is turned on again, if an abnormality is detected by the abnormality detection unit while the operation switch is turned on and the motor is driven. The determination may be configured to determine that the abnormality detected by the abnormality detection unit is the second type abnormality, if the abnormality detection signal remains output from the abnormal detection unit even after execution of the pseudo-operation process.

According to the motor driven appliance thus configured, when the second type abnormality occurs while the operation switch is turned on and the motor is driven, it is possible to artificially change the operation switch from on to off and from off to on by changing the operation signal, even if the user of the motor driven appliance leaves the operation switch turned on. Therefore, if the abnormality occurred is the first type abnormality, an abnormal state is cleared and the abnormality detection signal is stopped. The specific process is not executed. On the other hand, if the abnormality occurred is the second type abnormality, the abnormal state is not cleared even after the pseudo-operation process is executed and the output of the abnormality detection signal continues. Thus, the specific process is executed. Accordingly, the user of the motor driven appliance can reliably determine that the second type abnormality has occurred, even if the operation switch remains turned on.

The pseudo-operation process may be a process to cause the operation signal output unit to output an operation signal indicating that the operation switch is turned off and, after a predetermined time, to output an operation signal indicating that the operation switch is turned on. As above, since the operation signal indicating the operation switch is turned on is output after a predetermined time from the output of the operation signal indicating that the operation switch is turned off the determination unit can reliably determine whether the second type abnormality has occurred.

At least the operation switch of the at least one switch may be set to be the abnormality confirmation switch. In this case, the determination unit may be configured as follows. That is, the determination unit may be configured to determine that an abnormality is the second type abnormality, if the abnormality is detected by the abnormality detection unit while the operation switch is turned on and the motor is driven, and when detection of the abnormality continues even after the operation switch is once turned off and is then turned on again.

According to the motor driven appliance thus configured, when an abnormality occurs, whether the abnormality is the second type abnormality is determined based on whether the abnormality continues even after the operation switch is actually turned off and turned on again. In addition, when the first type abnormality occurs, the operation switch is actually turned off. Thus it becomes possible to more reliably clear the first type abnormality.

The specific process executed by the processing unit may comprise a step for notifying occurrence of the second type abnormality. According to the step, the user can precisely learn when the second type abnormality occurs. Conversely, because the user is not notified in the event of the first type abnormality, it is possible to provide a motor driven appliance easy to use for the user.

The motor driven appliance may comprise a display unit configured to display remaining energy of the battery. In that case, the specific process executed by the processing unit may comprise a step of notifying occurrence of the second type abnormality by causing the display unit to display information indicating that the second type abnormality is occurring.

According to the motor driven appliance thus configured, the display unit that displays the remaining energy of the battery also serves to notify occurrence of the second type abnormality. Thus, there is no need to separately provide a means to notify occurrence of the second type abnormality. It is possible to achieve high performance while an increase in size and cost of the appliance is suppressed.

The motor driven appliance may comprise a remaining energy display switch for causing the display unit to display the remaining energy of the battery. The remaining energy display switch may be set as the abnormality confirmation switch. The processing unit may be configured, if the determination unit determines that the second type abnormality is detected when the remaining energy display switch is turned on, to notify occurrence of the second type abnormality.

According to the motor driven appliance thus configured, if the second type abnormality occurs when the remaining energy display switch is turned on, a notification (display) is given not on the remaining energy but on occurrence of the second type abnormality. Therefore, when the second type abnormality occurs, it is possible to notify the user of occurrence of the second type abnormality more quickly.

The processing unit may be configured to continue the notification until at least the abnormality confirmation switch is turned off and a predetermined time elapses, if the abnormality confirmation switch is turned on, and when an abnormality is detected by the abnormality detection unit and the determination unit determines that the abnormality is the second type abnormality. With such a configuration, when the second type abnormality occurs, it is possible to more reliably have the user acknowledge occurrence of the second type abnormality.

The motor driven appliance may be configured to comprise an appliance main body and the battery pack. The appliance main body may include at least the motor, the control unit, the determination unit, and the processing unit. The battery pack may be configured to accommodate the battery, and may be configured detachably attached to the appliance main body.

If the motor driven appliance comprises the appliance main body and the battery pack, the processing unit may be configured to operate by electric power of the battery when the battery pack is attached to the appliance main body. The abnormality detection unit may be at least included in the battery pack. The processing unit, when started by the battery pack attached to the appliance main body, and when an abnormality is detected by the abnormality detection unit in the battery pack, may be configured to execute the specific process.

According to the motor driven appliance thus configured, in the event of the second type abnormality in the battery pack, and if the battery pack is attached to the appliance main body, the specific process is executed regardless of whether there is a switch operation. Therefore, it is possible to quickly execute an appropriate process against the second type abnormality that is occurring.

BRIEF DESCRIPTION OF THE DRAWINGS

Exemplified embodiments of the present disclosure will be described below by way of example with reference to the accompanying drawings in which:

FIG. 3 is an explanatory view for explaining a protective function provided in the motor driven appliance, errors that can be determined by the motor driven appliance, an error reset condition per error, and a timing for error display;

FIG. 5 is a flowchart of a main process of the first embodiment;

FIG. 6 is a flowchart showing details of an error detection process of S140 in the main process;

FIG. 7 is a flowchart showing details of an AS detection process of S210 in the error detection process;

FIG. 9 is a flowchart showing details of a remaining energy determination process of S410 in the display process;

FIG. 10 is a flowchart showing details of an error display determination process of S420 in the display process;

FIG. 11 is a flowchart showing details of a display lighting process of S430 in the display process;

FIG. 14 is a flowchart of the main process of the second embodiment;

FIGS. 15A and 15B are flowcharts showing an AS detection process executed as one of error detection processes of S850 in a main process;

FIG. 16 is a flowchart showing details of a notification process of S880 in the main process;

FIG. 18 is an explanatory diagram for explaining a function of each signal input circuit shown in FIGS. 17A and 17B.

DETAILED DESCRIPTION OF THE PREFERRED EMBODIMENTS

First Embodiment

Figure 1:
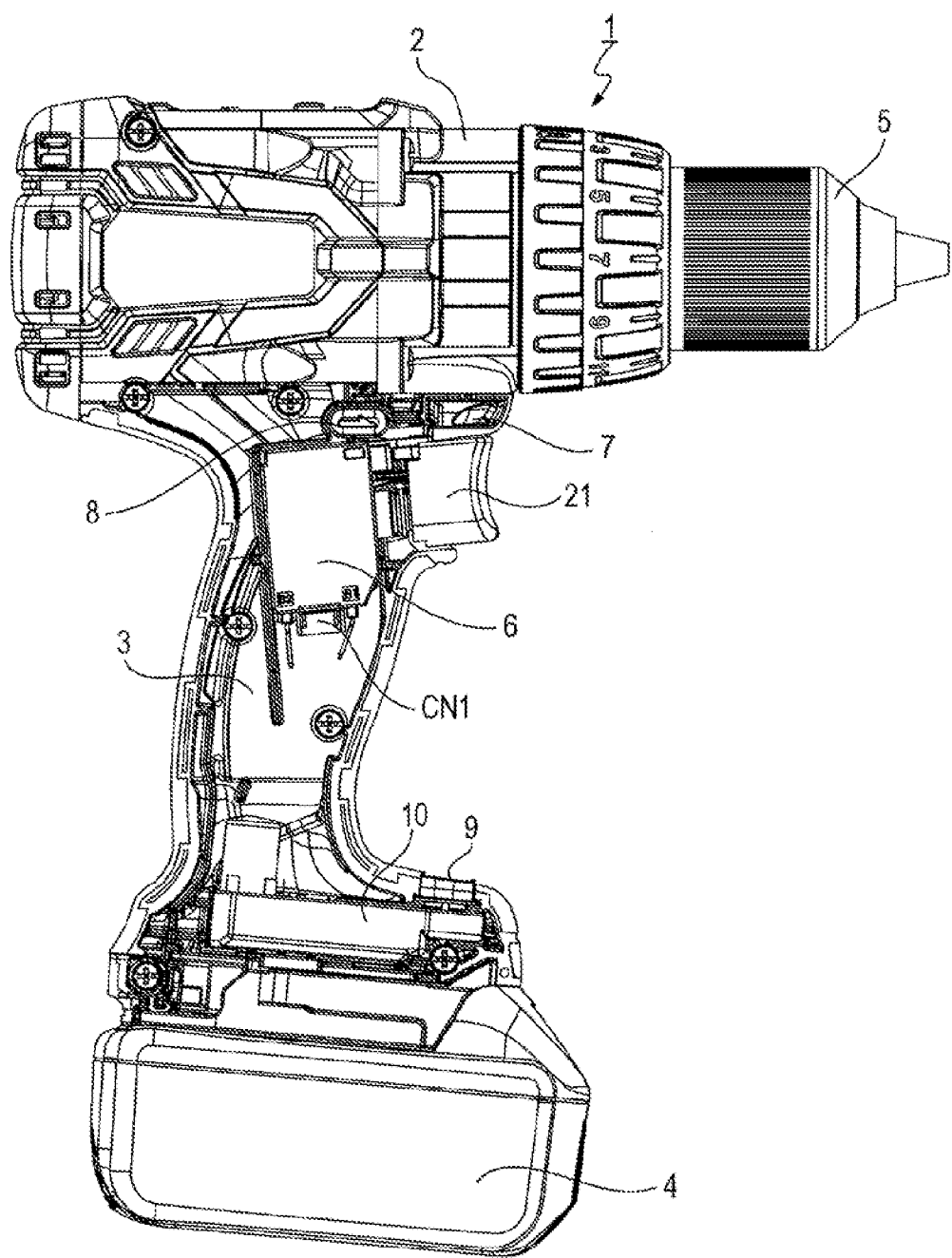
FIG. 1 is a side view showing an appearance of a motor driven appliance of a first embodiment of the present disclosure.

As shown in FIG. 1, a motor driven appliance 1 of the first embodiment is configured as an electric power tool. Hereinafter, the motor driven appliance is referred to as "appliance". Specifically, the appliance 1 is configured as a rechargeable driver drill. The appliance 1 comprises a main body 2, a handle part 3, and a battery pack 4.

A motor M1 (see FIG. 2) to be described later is accommodated in a rear portion of the main body 2 (left side in FIG. 1). A not shown driving force transmission mechanism is accommodated in a front portion of the main body 2 (right side in FIG. 1). A sleeve 5 for mounting a not shown tool bit (e.g., driver bit, etc.) is rotatably projected at a front end of the main body 2. To the sleeve 5, a rotational driving force of the motor M1 is transmitted over the driving force transmission mechanism and the like.

The handle part 3 is extended downward of the main body 2. To a lower end of the handle part 3, the battery pack 4 is detachably attached. In order to explain details of the handle part 3, FIG. 1 shows the appliance 1 in which one side of the handle part 3 is removed so that an interior of the handle part 3 can be visible.

A switch part 6 for a user to operate rotation of the motor M1 of the appliance 1 is provided at a top of the handle part 3. The switch part 6 has a trigger switch 21 that is operable with the user holding the handle part 3. At a lower end of the switch part 6, a connector CN1 is provided.

A lighting LED 7 and a changeover switch 8 are provided above the switch part 6. The lighting LED 7 is configured to radiate light to the front of the appliance 1, that is, to a work area of the user. The changeover switch 8 is a switch for the user to selectively switch a rotation direction of the motor M1 between a forward direction and a reverse direction.

A display unit 9 is provided at a lower end of the handle part 3. Various kinds of information are displayed on the display unit 9. The user of the appliance 1 can visually acknowledge contents of the display. The display unit 9 basically displays information indicating remaining energy of a battery 41 (see FIG. 2) in the battery pack 4. As described below, if a specific error occurs, the display unit 9 displays information indicating that the error has occurred.

Also, a controller 10 is accommodated inside the lower end of the handle part 3. The controller 10 operates with electric power supplied from the battery pack 4, and controls each part of the appliance 1.

Figure 2:
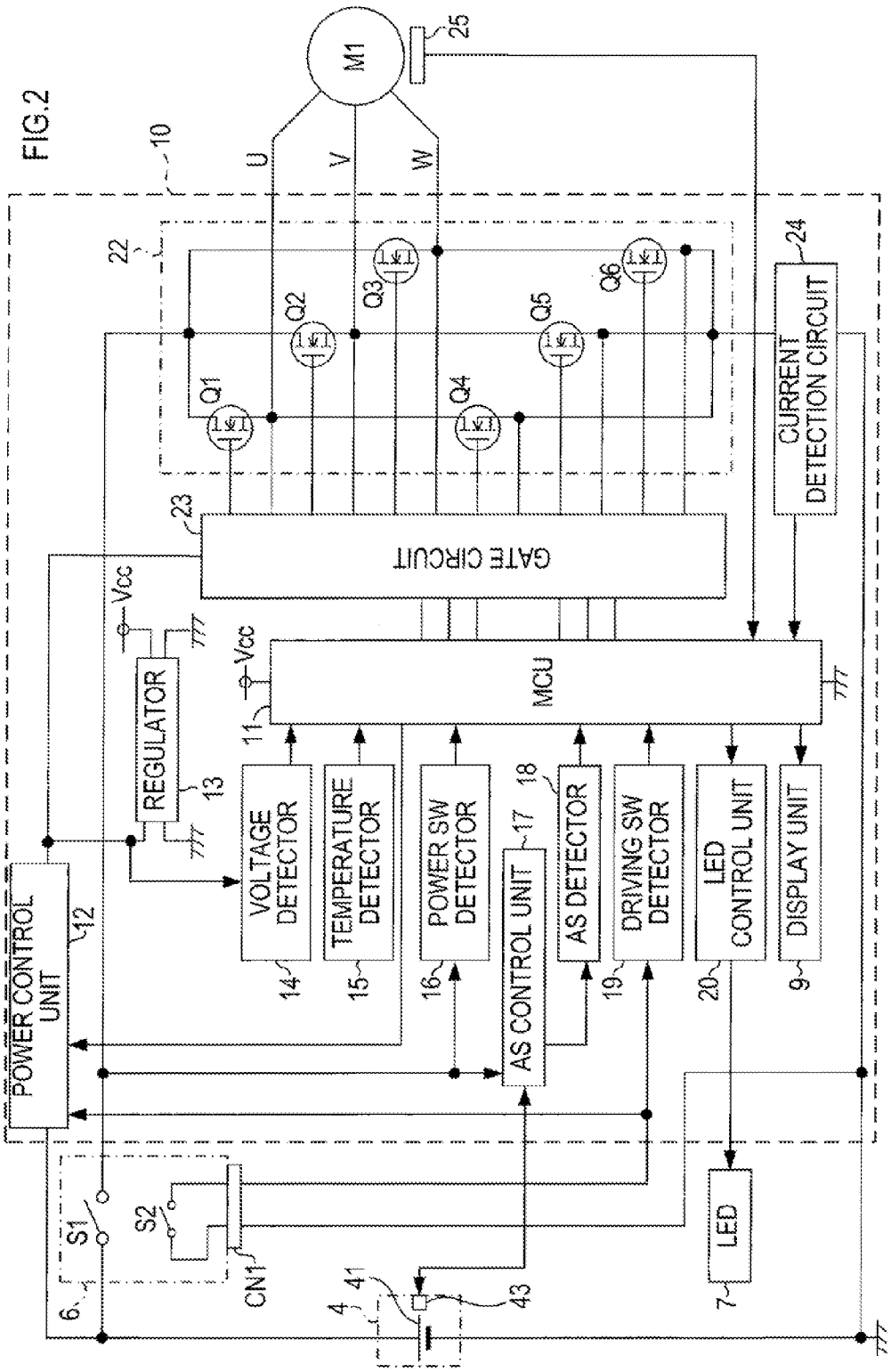
FIG. 2 is a circuit diagram of an electrical system in the motor driven appliance of the first embodiment.

An electrical system as shown in FIG. 2 is constructed inside the appliance 1.

As shown in FIG. 2, the battery pack 4 has the battery 41 inside thereof. The battery 41 comprises a plurality of not shown secondary battery cells connected in series, and is configured to output a battery voltage of a predetermined DC voltage value (for example, 14.4 V). The battery 41 can be repeatedly charged by connecting the battery pack 4 to a charger (not shown).

The switch part 6 has two switches, that is, a power switch S1 and a driving switch S2.

The power switch S1 is configured to operate with a trigger switch 21. More specifically, the power switch S1 is configured to be turned on when the trigger switch 21 is operated (on), and turned off when operation to the trigger switch 21 is stopped (off). The power switch S1 has a pair of contacts. One contact is connected to a positive electrode of the battery 41, and the other contact is connected to the controller 10.

The driving switch S2, like the power switch S1, is configured to operate with the trigger switch 21. That is, the driving switch S2 is configured to be turned on when the trigger switch 21 is operated, and turned off when operation of the trigger switch 21 is stopped. The driving switch S2 has a pair of contacts. Both the contacts are connected to the controller 10 via the connector CN1.

The controller 10 comprises a main control unit (MCU) 11. The MCU 11, in the first embodiment, is configured as a known microcomputer at least including a CPU, a memory, an I/O, and an A/D converter.

The controller 10 further comprises a power control unit 12. The power control unit 12 is connected to a positive electrode of the battery 41, and is supplied with the battery voltage. The power control unit 12 is connected to one of the contacts (the contact different from a connection point with a ground line) of the driving switch S2, and is thus configured to be able to acknowledge on or off of the driving switch S2.

The power control unit 12, when the trigger switch 21 is operated and the driving switch S2 is turned on, outputs the battery voltage supplied from the battery 41. Then, when operation of the trigger switch 21 is stopped and the driving switch S2 is turned off, the power control unit 12 stops the output of the battery voltage after a predetermined time (e.g., one minute) elapses from the turning-off of the driving switch S2. More specifically, when the driving switch S2 is turned off, a stop command is input from the MCU 11 to the power control unit 12 after a predetermined time elapses from the turning-off of the driving switch S2. The power control unit 12, even if the driving switch S2 is turned off, continues the output of the battery voltage until the stop command is input from the MCU 11. The power control unit 12 stops the output of the battery voltage when the stop command is input from the MCU 11.

The controller 10 further comprises a regulator 13. The regulator 13 steps down the battery voltage output from the power control unit 12 and generates a control voltage Vcc of the predetermined voltage value (for example, 5 V). The control voltage Vcc generated by the regulator 13 is supplied to various circuits, including the MCU 11, in the controller 10. The MCU 11 operates with the control voltage Vcc supplied from the regulator 13 as a power source.

The controller 10 further comprises a voltage detector 14. The voltage detector 14 is connected to a battery voltage supply path from the power control unit 12 to the regulator 13. The voltage detector 14 is configured to detect a value of the battery voltage input via the power control unit 12 and output to the MCU 11 a voltage detection signal indicating the value of the detected battery voltage.

The controller 10 further comprises a temperature detector 15. The temperature detector 15 is configured to detect a temperature of the controller 10 and output to the MCU 11 a temperature detection signal indicating the detected temperature.

The controller 10 further comprises a power switch detector 16. In FIG. 2, "SW" is an abbreviation of the switch. In the present specification, the switch is sometimes abbreviated as "SW".

The power SW detector 16 is connected to the other contact of the power switch S1 in the switch part 6. The power SW detector 16 is configured, when the power switch S1 is turned on and the battery voltage is input via the power switch S1, to output to the MCU 11 a first operation detection signal indicating that the trigger switch 21 is being operated.

The controller 10 further comprises an AS control unit 17. The AS is an abbreviation of auto-stop (automatic stop). As described below, the battery pack 4 comprises a protector 43 having a protective function to protect the battery pack 4 from an abnormality upon detection of the abnormality. Hereinafter, this protective function is called "battery AS protective function". When an abnormality is detected, an AS signal indicating that an abnormality is detected is output from the battery pack 4 (protector 43, in particular). The AS signal is input to the AS control unit 17 of the controller 10. When the AS signal is input from the battery pack 4, the AS control unit 17 outputs the AS signal directly, or a signal appropriately converted, to an AS detector 18.

The battery pack 4 includes a controller for implementing the battery AS protective function described above. The battery AS protective function, including an output of the AS signal, is executed by the controller. The controller provided in the battery pack 4 may be configured from a microcomputer, or from various logic circuits. Its specific structure is not particularly limited. The same applies to each of battery packs 61 and 62 of a second embodiment to be described later.

The AS signal itself, for example, may be a signal indicating abnormality detection. That is, the AS signal may be a signal that is output if an abnormality is detected and that is not output if an abnormality is not detected. Alternatively, the AS signal may be a signal that is output at all times for a predetermined period, and that indicates that the appliance is normal while an abnormality is not detected and indicates that the appliance is abnormal when an abnormality is detected. The predetermined period may be, for example, a period during which the trigger switch 21 is operated. In the first embodiment, the description will continue, assuming the former case of the above examples, that is, assuming that the AS signal is output if an abnormality is detected.

The AS control unit 17 also has a function of outputting to the battery pack 4 an operation signal indicating an operation state of the trigger switch 21. That is, the AS control unit 17 is connected to the other contact of the power switch S1 in the switch part 6. The AS control unit, in response to an on/off state of the power switch S1, outputs the operation signal indicating the operation state of the trigger switch 21 to the battery pack 4 (protector 43, in particular).

The AS signal output from the battery pack 4 is input to the AS detector 18 via the AS control unit 17. The AS detector 18, based on the input AS signal, determines whether the AS protective function is operated in the battery pack 4, and outputs to the MCU 11 an AS detection signal indicating a determination result. The AS detector 18 may be configured to output to the MCU 11 the AS signal input from the AS control unit 17 directly or a signal appropriately converted.

The controller 10 further comprises a driving SW detector 19. The driving SW detector 19 is connected to one contact of the driving switch S2 in the switch part 6. The other contact of the driving switch S2 is connected to the ground line having the same potential as a negative electrode of the battery 41. The drive SW detector 19 is configured, when the driving switch S2 is turned on and a voltage of the ground line is input through the driving switch S2, to output to the MCU 11 a second operation detection signal indicating that the trigger switch 21 is operated.

Although not shown, the switch part 6 is provided with a variable resistor configured such that a resistance value changes in accordance with an operation amount of the trigger switch 21. A signal indicating the resistance value of the variable resistor is input to the controller 10 via the connector CN1 from the switch part 6. The signal indicating the resistance value corresponds to a signal indicating the operation amount of the trigger switch 21. Therefore, the MCU 11 can learn the operation amount of the trigger switch 21, based on the signal from the switch part 6.

The controller 10 further comprises a LED control unit 20. The LED control unit 20 is configured to turn on/off the above lighting LED 7, in accordance with a light-on/light-off command from the MCU 11.

The controller 10 comprises the display unit 9 described above. The display unit 9 is configured to display the remaining energy of the battery 41 in accordance with a display command from the MCU 11. More specifically, the MCU 11 calculates the remaining energy of the battery 41 based on the above voltage detection signal input from the voltage detector 14 and outputs a display command based on the calculated remaining energy to the display unit 9.

Figure 4A:
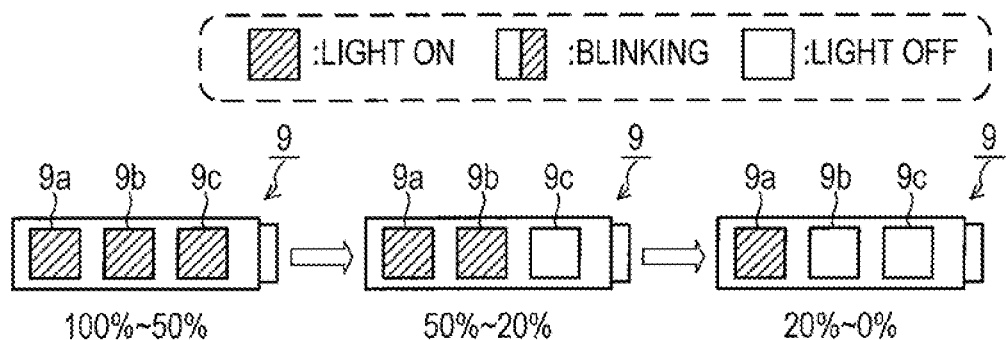
FIG. 4A is an explanatory view showing an example of display of remaining energy of a battery in a display unit.
Figure 4B:
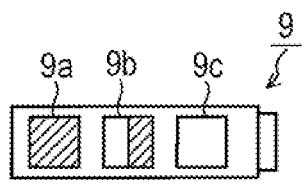
FIG. 4B is an explanatory view showing an example of error display in the display unit when an error that cannot be cleared by retrigger has occurred.
Figure 4C:
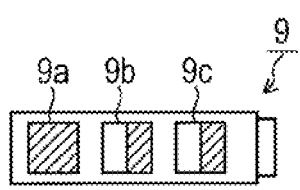
FIG. 4C is an explanatory view showing an example of error display in the display unit when a controller high temperature error has occurred.

The display unit 9, in this embodiment, comprises three LEDs 9a to 9c (see FIGS. 4A to 4C). The display unit 9 is configured to display the remaining energy of the battery 41 by lighting the LED corresponding to the display command input from the MCU 11.

As shown in FIG. 4A, if the remaining energy of the battery 41 is 100% to 50% for energy at full charge, the three LEDs 9a to 9c are all turned on. If the remaining energy of the battery 41 is less than 50% and not less than 20%, the two LEDs 9a and 9b are turned on. If the remaining energy of the battery 41 is less than 20%, the one LED 9a is turned on.

However, if a specific error occurs, the MCU 11 outputs an error notification command to the display unit 9 so as to cause the display unit 9 to display information indicating that an error has occurred. Specifically, the display unit 9 turns on the LEDs according to the error that has occurred.

The controller 10 further comprises a driver circuit 22 for driving the motor M1. In this first embodiment, the motor M1 is configured as a three-phase brushless motor. Therefore, the driver circuit 22 of the first embodiment comprises six switching elements Q1 to Q6. Terminals U, V, and W of the motor M1 are connected to the power switch S1 and the negative electrode of the battery 41, via the switching elements Q1 to Q6. Each of the terminals U, V, and W is connected to one of not shown three coils provided in the motor M1, in order to rotate a not shown rotor in the motor M1.

The controller 10 is provided with a gate circuit 23. The battery voltage is supplied to the gate circuit 23 through the power control unit 12. The gate circuit 23 is configured to turn on/off each of the switching elements Q1 to Q6 based on a drive command from the MCU 11.

The controller 10 further comprises a current detection circuit 24. The current detection circuit 24 is configured to detect a value of a current flowing from the motor M1 to the negative electrode of the battery 41 via the driver circuit 22 and output a current detection signal indicating the value of the detected current to the MCU 11.

In the vicinity of the motor M1, a rotation position detector 25 is provided. The rotation position detector 25 is configured to output to the MCU 11 a rotation signal indicating that the rotor of the motor M1 is rotated by a certain angle each time a rotation position of the rotor of the motor M1 reaches a predetermined rotation position (i.e., each time the motor M1 is rotated by a predetermined amount). The rotation position detector 25 of this embodiment comprises a Hall sensor. A pulse signal as the rotation signal is output from the Hall sensor. However, it is not essential to use a Hall sensor as the rotation position detector 25. In place of the Hall sensor, other kinds of sensors may be used.

Now, the battery AS protective function of the battery pack 4 and the controller protective function of the controller 10 will be described with reference to FIG. 3.

The battery AS protective function, more specifically, includes first overload protection, second overload protection, first over-discharge protection, second over-discharge protection, and temperature protection.

The first overload protection of the battery AS protective function is a function to forcibly stop discharge to a load from the battery 41 when the battery 41 becomes a first overload state. The first overload state, for example, is a state in which a value of a discharge current from the battery 41 continues to be greater than a predetermined first current threshold for a predetermined time. The battery pack 4, when activating the first overload protection, outputs to the controller 10 an AS signal indicating that a first battery overload error (abnormality) has occurred in the battery pack 4. When the first battery overload error occurs, discharge from the battery 41 to the appliance main body is stopped. The MCU 11 also turns off all of the switching elements Q1 to Q6 based on the AS signal to forcibly stop power supply to the motor M1.

Even if the first battery overload error occurs and the motor M1 is forcibly stopped, an operator can perform an operation to turn off the trigger switch 21 once and then turn it on again (hereinafter, referred to as "retrigger") thereby to clear the first battery overload error and use the appliance 1 again. That is, the battery pack 4 activates the first overload protection due to occurrence of the first battery overload error, and stops discharge from the battery 41. In this state, when the trigger switch 21 is turned off, and an operation signal indicating that the trigger switch 21 has been turned off is input from the AS control unit 17 of the controller 10, the battery pack 4 clears the first battery overload error and stops the output of the AS signal. The MCU 11, when acknowledging through the AS detector 18 that the AS signal from the battery pack 4 is stopped, clears the forced off state of each of the switching elements Q1 to Q6. Thus, when the user of the appliance 1 turns on the trigger switch 21 again, the motor M1 is driven and work can be done.

That is, the first battery overload error is an error that can be cleared by retrigger. More specifically, clearance of the error itself is possible by turning off the trigger switch 21. Thereafter, the trigger switch 21 is turned on again so that the appliance 1 can be operated as usual.

The second overload protection of the battery AS protective function is a function, when the battery 41 has become a second overload state, to forcibly stop discharge from the battery 41 to a load. The second overload state may be appropriately defined. The second overload state, for example, may be a state in which the value of the discharge current from the battery 41 continues to be greater than a predetermined second current threshold (a value greater than the first current threshold) for a predetermined time. The second overload state, for example, may be a state in which the number of occurrences of the first overload state reaches a predetermined number of times cumulatively. The battery pack 4, when activating the second overload protection, outputs to the controller 10 an AS signal indicating that the second battery overload error (abnormality) has occurred in the battery pack 4. When the second battery overload error occurs, discharge from the battery 41 is stopped. The MCU 1 also turns off all of the switching elements Q1 to Q6 based on the AS signal to forcibly stop power supply to the motor M1.

The second battery overload error, unlike the first battery overload error, is an error that cannot be cleared even if the trigger switch 21 is turned off. It is not possible to operate the appliance 1 even by retrigger. To clear the second battery overload error, it is necessary to charge the battery 41 by connecting the battery pack 4 to a charger (not shown). When charging of the battery 41 is performed after the occurrence of the second battery overload error, the battery pack 4 clears the second battery overload error and stops the output of the AS signal.

The first over-discharge protection of the battery AS protective function is a function to forcibly stop discharge from the battery 41 to the load when the battery 41 has become a first over-discharged state. The first over-discharge state, for example, is a state in which the battery voltage continues to be not more than a predetermined first voltage threshold for a predetermined time. The battery pack 4 activates the first over-discharge protection, and outputs to the controller 10 an AS signal indicating that the first battery over-discharge error (abnormality) has occurred in the battery pack 4. When the first battery over-discharge error occurs, discharge from the battery 41 is stopped. The MCU 11 also turns off all of the switching elements Q1 to Q6 based on the AS signal to forcibly stop power supply to the motor M1.

Even if the first battery over-discharge error occurs and the motor M1 is forcibly stopped, the operator can clear the first battery over-discharge error by retrigger, and use the appliance 1 again. That is, if an operation signal indicating that the trigger switch 21 has been turned off is input from the AS control unit 17 of the controller 10, after activating the first over-discharge protection due to occurrence of the first battery over-discharge error, the battery pack 4 clears the first battery over-discharge error and stops the output of the AS signal. The MCU 11, when acknowledging through the AS detector 18 that the AS signal from the battery pack 4 is stopped, clears the forced off state of each of the switching elements Q1 to Q6. Thus, when the user of the appliance 1 turns on the trigger switch 21 again, the motor M1 is driven and work can be done. That is, the first battery over-discharge error is an error that can be cleared by retrigger The second over-discharge protection of the battery AS protective function is a function to forcibly stop discharge from the battery 41 to the load when the battery 41 has become a second over-discharge state. The second over-discharge state can be appropriately determined. The second over-discharge state, for example, may be a state in which the battery voltage continues to be not more than a predetermined second voltage threshold (a value lower than the first voltage threshold value) for a predetermined time.

The second over-discharge state, for example, may be a state in which the number of occurrences of the first over-discharged state reaches a predetermined number of times cumulatively. The battery pack 4, when activating the second over-discharge protection, outputs to the controller 10 an AS signal indicating that the second battery over-discharge error (abnormality) has occurred in the battery pack 4. When the second battery over-discharge error occurs, discharge from the battery 41 is stopped. The MCU 11 also turns off all of the switching elements Q1 to Q6 based on the AS signal to forcibly stop power supply to the motor M1.

The second battery over-discharge error, unlike the first battery over-discharge error, is an error that cannot be cleared even if the trigger switch 21 is turned off. It is not possible to operate the appliance 1 even by retrigger. To clear the second battery over-discharge error, it is necessary to charge the battery 41 by connecting the battery pack 4 to a charger (not shown). When the battery 41 is charged after occurrence of the second battery over-discharge error, the battery pack 4 clears the second battery over-discharge error and stops the output of the AS signal.

The temperature protection of the battery AS protective function is a function to forcibly stop discharge from the battery 41 to the load when a temperature of the battery 41 (hereinafter referred to as "battery temperature") becomes a high-temperature state. In what case it is determined the high-temperature state can be appropriately determined. The high-temperature state, for example, may be a state in which the battery temperature continues to exceed a predetermined temperature threshold for a predetermined time. The battery pack 4, when activating the temperature protection, outputs to the controller 10 an AS signal indicating that a battery high temperature error (abnormality) has occurred in the battery pack 4. When the battery high temperature error occurs, discharge from the battery 41 is stopped. The MCU 11 also turns off all of the switching elements Q1 to Q6 based on the AS signal to forcibly stop power supply to the motor M1.

The battery high temperature error is an error that cannot be cleared immediately even if the trigger switch 21 is turned off. The appliance 1 cannot be operated immediately by retrigger. In order to clear the battery high temperature error, it is necessary to cool down the battery 41 to lower the temperature of the battery 41. The battery pack 4, when the battery 41 is no longer in a high-temperature state after the trigger switch 21 is turned off, clears the battery high temperature error and stops the output of the AS signal.

Now, the controller protective function of the MCU 11 of the controller 10 will be explained. The controller protective function, more specifically includes an overload protection, a lock protection, and an over-discharge protection, and a temperature protection.

The overload protection of the controller protective function is a function to forcibly stop discharge from the battery 41 to the motor M1 when the appliance 1 becomes overloaded. The MCU 11 is able to detect a current (load current) flowing through the motor M1 based on the current detection signal input from the current detection circuit 24. The MCU 11, when a state in which the load current continues to exceed a predetermined current threshold for a predetermined time, determines that a body overload error has occurred, and activates the overload protection. Specifically, the MCU 11 turns off all of the switching elements Q1 to Q6 to forcibly stop power supply to the motor M1. Even if the body overload error occurs and the motor M1 is forcibly stopped, the operator can clear the body overload error by retrigger, and use the appliance 1 again. In other words, the body overload error is an error that can be cleared by retrigger.

The lock protective function of the controller protective function is a function to forcibly stop power supply from the battery 41 to the motor M1 when the motor M1 is locked during operation. The MCU 11 is able to detect a rotation state of the motor M1 based on the rotation signal input from the rotation position detector 25. The MCU 11, when rotation of the motor M1 stops for a predetermined time even if the trigger switch 21 is turned on, determines that the motor lock error has occurred, and activates the lock protective function. Specifically, the MCU 11 turns off all of the switching elements Q1 to Q6 to forcibly stop the power supply to the motor M1. Even if the motor lock error occurs and power supply to the motor M1 is stopped, the operator can clear the motor lock error by retrigger and use the appliance 1 again. In other words, the motor lock error is an error that can be cleared by retrigger.

The over-discharge protection of the controller protective function is a function to forcibly stop discharge from the battery 41 to the load when the appliance 1 is over-discharged. The MCU 11 is able to detect the battery voltage based on the voltage detection signal input from the voltage detector 14. The MCU 11, if the battery voltage continues to be not more than a predetermined voltage threshold for a predetermined time, determines that a body over-discharge error has occurred and activates the over-discharge protection. Specifically, the MCU 11 turns off all of the switching elements Q1 to Q6 to forcibly stop the power supply to the motor M1. Even if the body over-discharge error occurs and the motor M1 is forcibly stopped, the operator can clear the body over-discharge error by retrigger and use the appliance 1 again. In other words, the body over-discharge error is an error that can be cleared by retrigger.

The temperature protection of the controller protective function is a function to forcibly stop discharge from the battery 41 to the load when a temperature of the controller 10 becomes a high-temperature state. The MCU 11 is able to detect the temperature of the controller 10 based on the temperature detection signal input from the temperature detection unit 15. The MCU 11, when the temperature of the controller 10 continues to exceed a predetermined temperature threshold for a predetermined time, determines that a controller high temperature error has occurred and activates the temperature protection. Specifically, the MCU 11 turns off all of the switching elements Q1 to Q6 to forcibly stop the power supply to the motor M1.

The controller high temperature error is an error that cannot be cleared immediately even if the trigger switch 21 is turned off. The appliance 1 cannot be operated immediately even after retrigger. To clear the controller high temperature error, it is necessary to lower the temperature of the controller 10 by cooling the controller 10. The MCU 11, after the trigger switch 21 is turned off and when the controller 10 is no longer in a high temperature state, clears the high-temperature controller error and has the appliance 1 available again.

In the appliance 1 of the first embodiment, the battery pack 4 is able to detect five types of errors, that is, the first battery overload error, the second battery overload error, the first battery over-discharge error, the second battery over-discharge error, and the battery high temperature error. When any of the above five types of errors is detected, the protective function corresponding to the detected error is activated, and the AS signal indicating the error is output to the controller 10. Also, among the above five types of errors, the first battery overload error and the first battery over-discharge error are errors that can be cleared by turning off the trigger switch 21. In other words, the first battery overload error and the first battery over-discharge error are the errors that can be cleared by retrigger and allow the appliance 1 to operate again.

On the other hand, the MCU 11 is able to detect four types of errors, that is, the body overload error, the motor lock error, the body over-discharge error, and the controller high temperature error. The MCU 11, when detecting any of the above four types of errors, activates the protective function corresponding to the detected error. Among the four types of errors, three of the errors other than the controller high temperature error are errors that can be cleared by turning off the trigger switch 21. In other words, the body overload error, the motor lock error, and the body over-discharge error are errors that can be cleared by retrigger and allow the appliance 1 to operate again.

The MCU 11, when any one of the above five types of errors is detected in the battery pack 4, can acknowledge that an error has occurred in the battery pack 4 based on the AS signal input from the battery pack 4. That is, the MCU 11 is able to detect occurrence of at least nine types of errors, including at least the above four types of errors that can be detected by itself and the five types of errors detected in the battery pack 4.

If an error is detected in itself or in the battery pack 4 and the error is not an error that can be cleared by turning off the trigger switch 21, thus an error that allows the appliance 1 to operate again by retrigger (hereinafter, "retrigger clear error"), the MCU 11 causes the display unit 9 to display information indicating that an error has occurred.

Specifically, when the AS signal is input from the battery pack 4, and if the input of the AS signal still continues even after the trigger switch 21 is retriggered, it is determined that an error that is not a retrigger clear error (error that cannot be cleared by retrigger) has occurred in the battery pack 4, and an error message as shown in FIG. 4B is displayed. In other words, the first LED 9a is turned on, the second LED 9b is blinked, and the third LED 9c is turned off.

Also when the MCU 11 itself has detected the controller high temperature error, an error message is displayed because it is an error that cannot be cleared by retrigger. Specifically, as shown in FIG. 4C, the first LED 9a is turned on, and both the second LED 9b and the third LED 9c are blinked.

On the other hand, the MCU 11, when an error is detected in itself or in the battery pack 4, and if the error is a retrigger clear error, does not cause the display unit 9 to make error display.

Next, a main process executed by the MCU 11 will be described with reference to FIG. 5. The MCU 11, by executing the main process shown in FIG. 5, performs control of the motor M1, error determination as described above, and various controls on such as the error display and display of the remaining energy. The MCU 11 when started with power supply from the regulator 13 starts the main process. More specifically, the CPU in the MCU 11 executes a program of the main process stored in the memory of the MCU 11 thereby to start the main process.

The MCU 11, after starting the main process of FIG. 5, determines in S110 whether a predetermined time base which is a control period of motor drive has elapsed, thereby to wait for the time base to elapse from previous execution of S120 and subsequent processes.

If it is determined that the time base has elapsed in S110, the MCU 11 sequentially executes a SW operation detection process (S120), an AD conversion process (S130), an error detection process (S140), a motor control process (S150), and a display process (S160). Thereafter, the process returns to S110. That is, in the main process of the first embodiment, a series of processes of S120 to S160 are periodically executed at the predetermined time base.

In the SW operation detection process (S120), states (on or off) of the power switch S1 and the driving switch S2 are detected based on the operation detection signals input respectively from the power supply SW detector 16 and from the driving SW detector 19.

In the AD conversion process (S130), an AD conversion process is executed in which various analog signals to be input to the MCU 11 are converted into digital data. The signals subject to AD conversion include a signal indicating the operation amount of the trigger switch 21 input from the switch part 6, the voltage detection signal input from the voltage detector 14, the temperature detection signal input from the temperature detection unit 15, the current detection signal input from the current detection circuit 24, the rotation signal input from the rotation position detector 25, and the like.

In the error detection process (S140), presence or absence of the at least nine types of errors described with reference to FIG. 3 is detected. Details on the error detection process of S140 will be described later.

In the motor control process of S150, the drive motor M1 is controlled in accordance with the operation state of the trigger switch 21. If any of the above-mentioned error has occurred, the corresponding protective function is activated to forcibly stop power supply to the motor M1 even if the trigger switch 21 is turned on, and maintains the forcibly stopped state until the trigger switch 21 is turned off.

In the display process (S160), the display unit 9 is controlled. Details of the display process of S160 will be described later.

Next, the error detection process S140 will be described with reference to FIG. 6. The MCU 11, when proceeding to the error detection process of S140, executes an AS detection process in S210 as shown in FIG. 6. The AS detection process is a process mainly based on presence or absence of the AS signal from the battery pack 4. Details thereof are shown in FIG. 7.

As shown in FIG. 7, the MCU 11, in S310 of the AS detection process, determines whether the power switch S1 is turned on, and thus whether the trigger switch 21 is turned on. This determination may be performed based on the driving switch S2.

If the power switch S1 is turned off, that is, if the trigger switch 21 is turned off, an ASOK flag, an AS check completion flag, and an AS error flag are all cleared in S320.

If the power switch S1 is turned on, that is, if the trigger switch 21 is turned on, it is determined in S330 whether the AS signal is input from the battery pack 4. If the AS signal is not input, it is determined whether the AS check completion flag is set in S340. If the AS check completion flag is set, the AS detection process ends. If the AS check completion flag is not set, both the ASOK flag and the AS check completion flag are set in S350.

If the AS signal is input from the battery pack 4, both the AS error flag and the AS check completion flag are set in S360. When the AS detection process in FIG. 7 (process of S210 in FIG. 6) ends, the process proceed to S220.

In S220, a high-temperature detection process is executed. Specifically, based on the temperature detection signal from the temperature detector 15, it is determined whether the controller high temperature error is occurring. If the controller high temperature error is occurring, occurrence of the controller high temperature error is stored in the memory. If information indicating occurrence of the error is stored in memory even if the controller high temperature error has not occurred, the information is deleted.

In S230, a voltage drop detection process is executed. Specifically, based on the voltage detection signal from the voltage detector 14, it is determined whether the body over-discharge error is occurring. In S240, an overload detection process is executed. Specifically, based on the current detection signal from the current detection circuit 24, it is determined whether the body overload error is occurring.

If an error is detected by the error detection process of FIG. 6 (i.e., S140 in FIG. 5), rotation of the motor M1 is forcibly stopped in S150. That is, when either the AS signal is input in S210 or an error is detected in any of S220 to S240, rotation of the motor M1 is forcibly stopped in the motor control process of S150.

Figure 8:
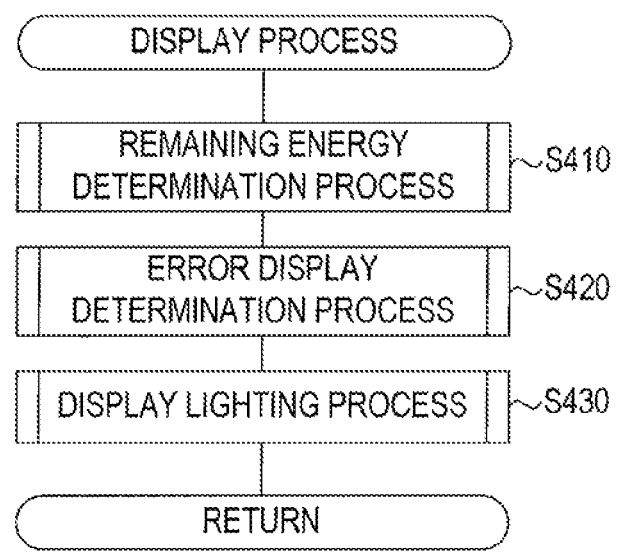
FIG. 8 is a flowchart showing details of a display process of S160 in the main process.

Next, the display process of S160 in the main process of FIG. 5 will be described with reference to FIG. 8. The MCU 11, when proceeding to the display process in S160, as shown in FIG. 8, a remaining energy determination process is executed in S410. Details of the remaining energy determination process are as shown in FIG. 9.

The MCU 11, when proceeding to the remaining energy determination process in FIG. 9, determines in S510 whether the power switch S1 is turned on, as in S310. When the power switch S1 is turned off, the MCU 11 ends the remaining energy determination process.

If the power switch S1 is turned on, it is determined in S520 whether remaining energy determination may begin. Specifically, it is determined whether it is a good condition to determine the remaining energy. For example, it can be determined that it is a good condition to determine the remaining energy if a predetermined time (for example, several tens of milliseconds) or more has elapsed after the trigger switch 21 is turned on.

If it is not a good condition to determine the remaining energy, the MCU 11 ends the remaining energy determination process. If it is a good condition to determine the remaining energy, it is determined in S530 whether to end the remaining energy determination. For example, if a certain time or more has elapsed after the trigger switch 21 is turned on, or when the trigger switch 21 is turned off, etc., it is determined that the remaining energy determination should end, and the remaining energy determination process ends.

If the remaining energy determination should not yet end, the remaining energy of the battery 41 is calculated based on the voltage detection signal from the voltage detector 14 in S540. In S550, it is determined whether the calculated remaining energy is 50% or more of a fully charged state. If the remaining energy is not less than 50% of the fully charged state, both a display request flag of "remaining energy: 50% or more" and a determination flag are set in S560.

If the remaining energy is less than 50% of the fully charged state, it is determined in S570 whether the remaining energy is 20% or more of the fully charged state. If the remaining energy is not less than 20% of the fully charged state, both the display request flag of "remaining energy: 50%" and the determination flag are set in S580. If the remaining energy is less than 20% of the fully charged state, both the display request flag of "remaining energy: 20%" and the determination flag are set in S590.

The determination flag that has been set is cleared at a predetermined timing. The determination flag, for example, may be cleared when it is determined that the remaining energy determination should end in S530, or when a certain time has elapsed since the remaining energy determination has been determined to be terminated in S530.

When the remaining energy determination process in FIG. 9 (S410 in FIG. 8) completes, the MCU 11 executes an error display determination process in S420. Details of the error display determination process are as shown in FIG. 10.

The MCU 11, when proceeding to the error display determination process in FIG. 10, determines in S610 whether the AS error flag is set. If the AS error flag is not set, it is determined in S620 whether the power switch S1 is turned on, in the same way as in S310. If the power switch S1 is turned off, the MCU 11 ends the error display determination process. If the power switch S1 is turned on, it is determined in S630 whether the AS check completion flag is set. If the AS check completion flag is not set, the MCU 11 ends the error display determination process. If the AS check completion flag is set, the display request flag of "AS error" is cleared in S640.

If the AS error flag is set in S610, it is determined in S650 whether the ASOK flag is set. If the ASOK flag is set, the process moves to S620. In this case, if the power switch S1 is on and the AS check completion flag is set, the display request flag of "AS error" is cleared in S640. On the other hand, if the ASOK flag is not set in S650, the display request flag of "AS error" is set in S660.

When the error display determination process in FIG. 10 (S420 in FIG. 8) completes, the MCU 11 performs a display lighting process in S430. Details of the display lighting process are as shown in FIG. 11.

The MCU 11, when proceeding to the display lighting process in FIG. 11, determines in S710 whether the display request flag of "AS error" is set. If the display request flag of "AS error" is not set, it is determined in S720 whether the determination flag is set. If the determination flag is not set, a light-off process is executed in S730. In the light-off process, the three LEDs 9a to 9c of the display unit 9 are all turned off.

If the determination flag is set in S720, a remaining energy display process is executed in S740. Specifically, according to the display request flag set in the remaining energy determination process of S410 (FIG. 9 for details), lighting of the display unit 9 is controlled. More specifically, if the display request flag of "remaining energy: 50% or more" is set, all the three LEDs 9a to 9c are turned on, as illustrated in the left side of FIG. 4A. When the display request flag of "remaining energy: 50%" is set, the first LED 9a and second LED 9b are turned on, as illustrated in the middle of FIG. 4A. When the display request flag of "remaining energy: 20%" is set, only the first LED 9a is turned on, as illustrated in the right side of FIG. 4A.

If the display request flag "AS error" is set in S710, an AS error display process is executed in S750. Specifically, as illustrated in FIG. 4B, error display indicating that the AS signal is input from the battery pack 4 is performed.

How long the remaining energy is displayed on the display unit 9 in S740 (remaining energy display time) and how long an error message is displayed on the display unit 9 in S750 (error display time) may be appropriately determined. The two may be the same time, or may be different time. If the two are different, for example, the error display time may be set to be longer than the remaining energy display time.

If the display request flag of "AS error" is set in S710, it means that an error other than the retrigger clear error is detected in the battery pack 4.

That is, before the user turns on the trigger switch 21, the ASOK flag, the AS check completion flag, and the AS error flag are all cleared once (S320 in FIG. 7). Then, after the user turns on the trigger switch 21 and starts to use the appliance 1, the ASOK flag is generally set. If an error is detected in the battery pack 4 and the AS signal is output, the AS error flag and the AS check completion flag are set (S360 in FIG. 7). At this time, since the ASOK flag is set, the process does not to proceed to S660 in the error display determination process of S420 (see FIG. 10 for details). As long as the power switch S1 remains turned on (S620: YES), the display request flag of "AS error" continues to be cleared (S640).

On the other hand, since the motor M1 is forcibly stopped when the AS signal is input, the user usually attempts retrigger. When the user turns off the trigger switch 21, the ASOK flag, the AS check completion flag, and the AS error flag is all cleared once (S320 in FIG. 7). If the error detected in the battery pack 4 is the retrigger clear error, the output of the AS signal from the battery pack 4 is stopped when the trigger switch 21 is turned off. Conversely, if the error detected in the battery pack 4 is an error that cannot be cleared by retrigger, the output of the AS signal is not stopped only by turning off of the trigger switch 21, and the output of the AS signal continues.

Therefore, in the case of the retrigger clear error, since the AS signal is not input to the controller 10 when the user turns on the trigger switch 21 again, error display is not made. On the other hand, in the case of the error that cannot be cleared by retrigger, since the AS signal continues to be output when the user turns on the trigger switch 21 again (S330: YES in FIG. 7), the AS error flag is set (S360 in FIG. 7). Therefore, in the error display determination process of S420 (FIG. 10 for details), the display request flag of "AS error" is set in S660, whereby the AS error display process of S750 (FIG. 11) is executed, and error display is made by the display unit 9.

Although omitted in FIG. 10, presence or absence of the controller high temperature error is also determined in the error display determination process. When the controller high temperature error occurs, the display request flag of "high temperature error" is set. Then, although not shown, in the display lighting process of FIG. 11, even if the display request flag of "AS error" is not set (S710: NO) but the display request flag of "high temperature error" is set, error display indicating the controller high temperature error is made, as illustrated in FIG. 4C. The display request flag of "high temperature error" is cleared when the controller high temperature error is cleared.

According to the appliance 1 of the first embodiment described above, even when an error occurs in the appliance 1, error notification is performed if the error is an error that cannot be cleared by retrigger. On the contrary, such notification is not performed in the case of an error that can be cleared by retrigger. That is, if an error occurs in the appliance 1, an appropriate process corresponding to the type of the error is executed. When an error that cannot be cleared by retrigger occurs, the user can learn occurrence of the error appropriately. On the other hand, because an error is not notified in the case of an error that can be cleared by retrigger, it is possible to provide the appliance 1 easy to use for the user.

Furthermore, in the appliance 1 in this embodiment, notification is not performed at the time when an error occurs. If occurrence of the error still continues after the trigger switch 21 is turned off once and turned on again, it is determined that an error that cannot be cleared by retrigger has occurred and error notification is performed. Therefore, when an error occurs, it is possible to clearly determine whether the error is an error that can be cleared by retrigger.

Furthermore, the appliance 1 in this embodiment, the display unit 9 for displaying the remaining energy of the battery 41 also serves to notify the error. In other words, the appliance 1 is not provided with a notification unit separate from the display unit 9 for notifying occurrence of an error. The display unit 9 has at least the above two display functions. Therefore, while an increase in size and cost of the appliance 1 is suppressed, high performance of the appliance 1 is achieved.

Further, in the present embodiment, error display is given priority than display on the remaining energy of the battery 41 in the display unit 9. This means that, when an error is not occurring, the remaining energy of the battery 41 is displayed and, when an error that cannot be cleared by retrigger occurs, error display is preferentially displayed on the display unit 9. Therefore, the user can reliably and promptly acknowledge that an error that cannot be cleared by retrigger has occurred.

Second Embodiment

Figure 12A:
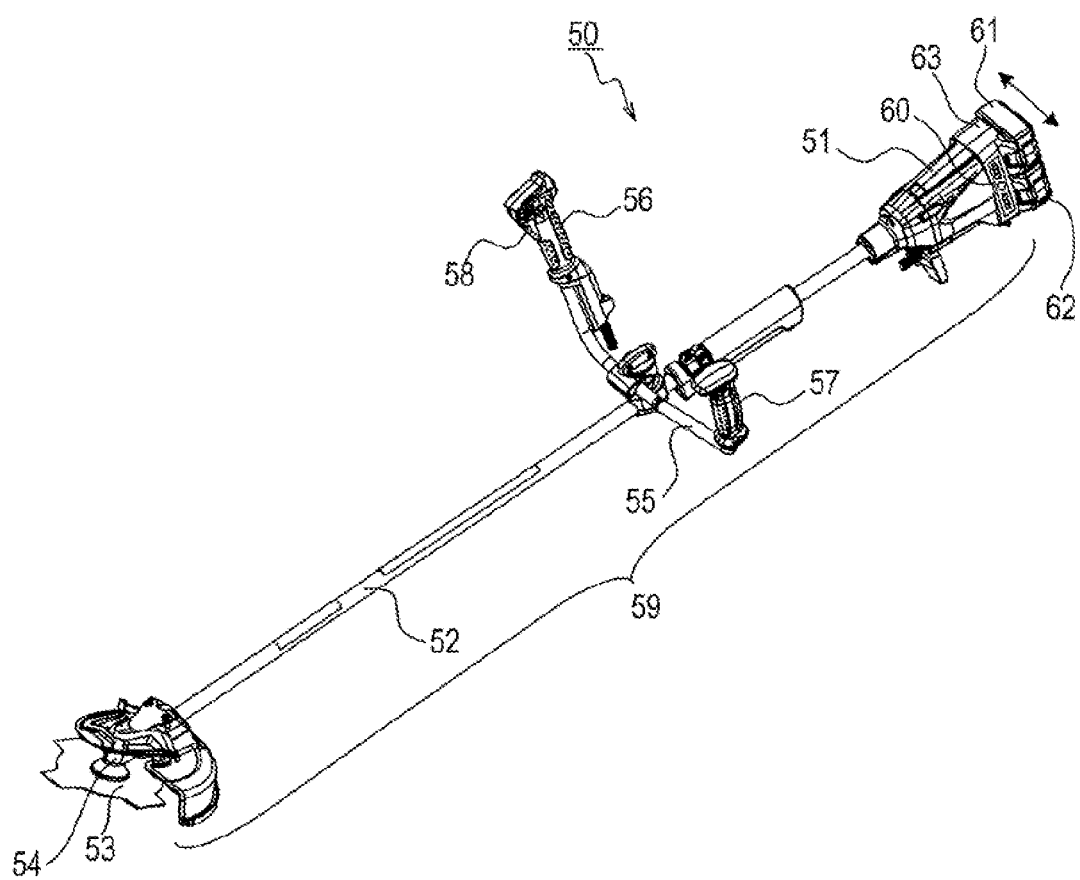
FIG. 12A is a perspective view showing an appearance of a motor driven appliance of a second embodiment.

Next, an appliance 50 of the second embodiment will be described with reference to FIG. 12A. As shown in FIG. 12A, the appliance 50 in the second embodiment is configured as an electric working appliance. More specifically, the appliance 50 is configured as a rechargeable brush cutter for weeding grass and small trees.

An appliance main body 59 of the appliance 50 comprises a motor unit 51, and a shaft pipe 52 connected to one end of the motor unit 51.

The motor unit 51 accommodates a later described motor 64 (see FIG. 13) and a control circuit for controlling the motor 64 inside the motor unit 51. The motor 64 of the present embodiment, as in the first embodiment, is a three-phase brushless motor. However, the kind of the motor 64 is not limited in particular. Any kinds of motor can be used as long as it can function as the appliance 50. Specifically, a brush DC (direct current) motor may be used, for example. The same applies to the motor M1 of the first embodiment.

The motor unit 51 has, at the other end of the motor unit 51, a battery mounting portion 63 for detachably attaching two battery packs, that is, a first battery pack 61 and a second battery pack 62. More specifically, the battery mounting portion 63 is configured such that each of the battery packs 61 and 62 can be individually attached and detached by sliding each of the battery packs 61 and 62 in a direction indicated by an arrow in the figure on the battery mounting portion 63.

The shaft pipe 52 is formed into a hollow rod. The shaft pipe 52 has a cutter mounting portion 54 for detachably attaching a cutter 53 at an end opposite to the motor unit 51. The cutter 53 has a substantially disc shape as a whole. A plurality of blades are provided on its periphery.

A handle 55 is provided in the vicinity of an intermediate position in an axial direction of the shaft pipe 52. This handle 55 has a right hand grip 56 to be gripped by a user of the appliance 50 with a right hand, and a left hand grip 57 to be gripped with a left hand. The right hand grip 56 has a trigger switch 58 for the user to manipulate rotation of the cutter 53.

A not shown driving force transmission shaft (hereinafter referred to as transmission shaft) is accommodated inside the shaft pipe 52. One end of the transmission shaft is coupled to a rotor of the later described motor 64 accommodated in the motor unit 51. The other end of the transmission shaft is coupled to the cutter 53 via a plurality of not shown gears provided to the cutter mounting portion 54. Therefore, a rotational driving force of the motor 64 is transmitted to the cutter 53 via the transmission shaft and the plurality of gears.

Figure 12B:
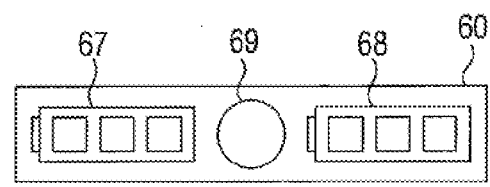
FIG. 12B is a top view showing an appearance of a display device.

A display device 60 is provided on one side of the motor unit 51. More specifically, the display device 60, as shown in FIG. 12B, comprises a first display unit 67, a second display unit 68, and a remaining energy display SW 69.

The first display unit 67 displays remaining energy of a battery in the first battery pack 61. The second display unit 68 displays remaining energy of a battery in the second battery pack 62. Each of the display units 67 and 68, similar to the display unit 9 of the first embodiment (see FIG. 4A to 4C), has three LEDs. Information indicating the remaining energy of the corresponding battery is displayed in exactly the same way as in FIG. 4A.

The remaining energy display SW 69 is a switch for displaying the remaining energy of the corresponding battery on each of the display units 67 and 68. In the second embodiment, when the remaining energy display SW 69 is depressed, the remaining energy of the corresponding battery is displayed on each of the display units 67 and 68 for a predetermined time. After the predetermined time elapses, each of the display units 67 and 68 is turned off.

If a specific error is occurring in one of the battery packs when the remaining energy display SW 69 is depressed, the display unit corresponding to the battery pack displays not the remaining energy of the battery but information indicating occurrence of the specific error for a predetermined time. If a specific error is occurring in the appliance main body when the remaining energy display SW 69 is depressed, information indicating occurrence of the error is displayed in both of the display units 67 and 68 for a predetermined time. If a specific error occurs in one of the battery packs while the trigger switch 58 is turned on, information indicating occurrence of the specific error is displayed on the display unit corresponding to the battery pack. If a specific error occurs in the appliance main body while the trigger switch 58 is turned on, information indicating occurrence of the error is displayed in both of the display units 67 and 68.

Figure 13:
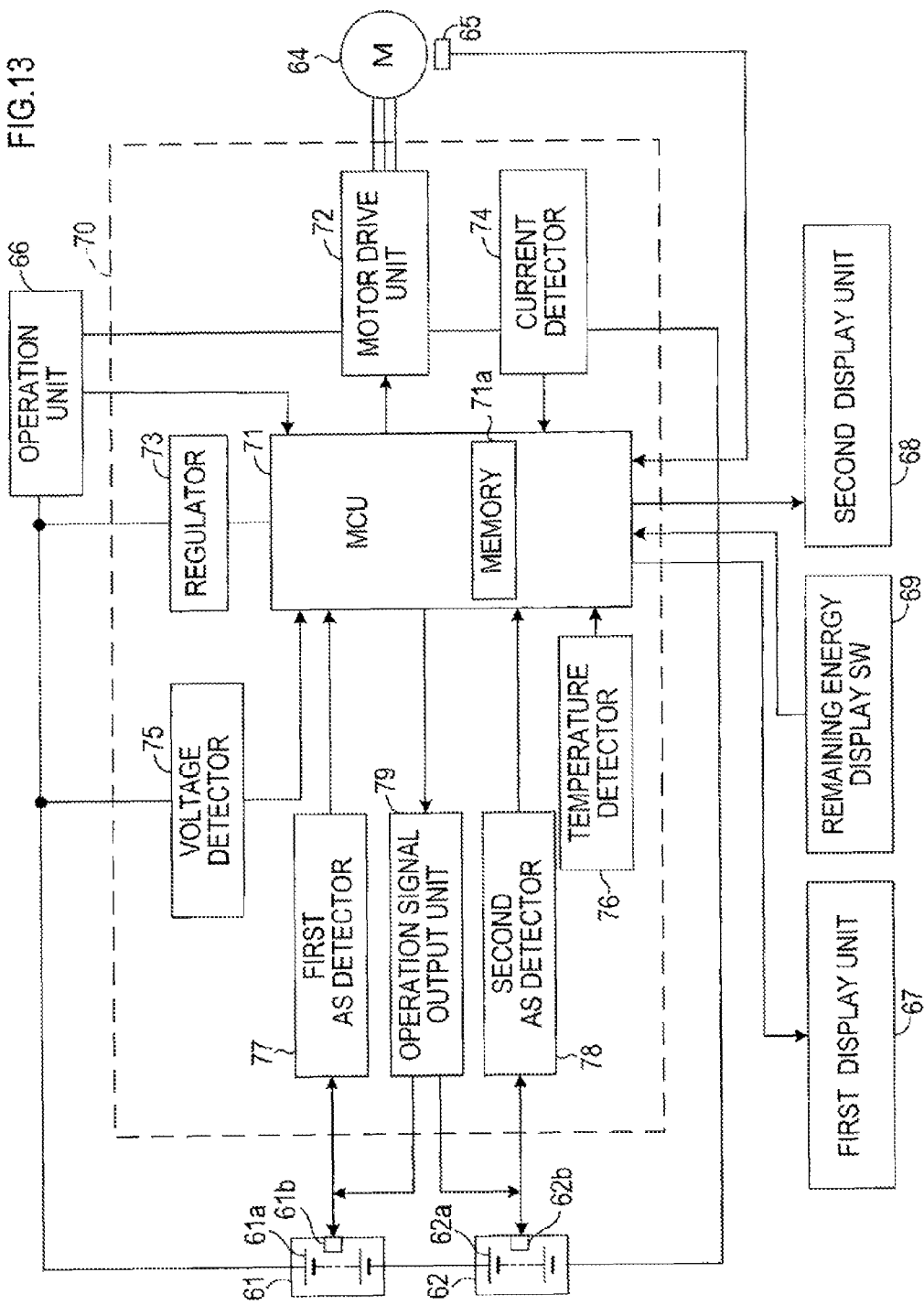
FIG. 13 is a circuit diagram of an electrical system in the motor driven appliance of the second embodiment of the present disclosure.

Next, an electrical system constructed inside the appliance 50 will be described with reference to FIG. 13. As shown in FIG. 13, in the appliance 50 of the second embodiment, the motor unit 51 incorporates the motor 64, a control circuit 70, and an operation unit 66.

The control circuit 70 comprises a MCU 71, a motor drive unit 72, a regulator 73, a current detector 74, a voltage detector 75, a temperature detector 76, a first AS detector 77, a second AS detector 78, and an operation signal output unit 79.

The first battery pack 61 incorporates a first battery 61*a*. The first battery 61*a* comprises a plurality of not shown secondary battery cells connected in series, and is configured to output a battery voltage of a predetermined DC voltage value. The second battery pack 62 incorporates a second battery 62*a*. The second battery 62*a* also comprises a plurality of not shown secondary battery cells connected in series, and is configured to output a battery voltage of a predetermined DC voltage value. Each of the batteries 61*a* and 62*a* is repeatedly chargeable by connecting each of the battery packs 61 and 62 to a charger (not shown).

The two battery packs 61 and 62, when attached to the battery mounting portion 63, are serially connected as shown in FIG. 13. Specifically, a positive electrode of the first battery 61*a* is connected to the motor drive unit 72 through the operation unit 66, and a negative electrode of the first battery 61*a* is connected to a positive electrode of the second battery 62*a*. A negative electrode of the second battery 62*a* is connected to the motor drive unit 72 via the current detector 74.

Both the battery packs 61 and 62, similar to the battery pack of the first embodiment, respectively comprise protectors 61*b* and 62*b* having the battery AS protective function. That is, both the battery packs 61 and 62 (protectors 61*b* and 62*b*, in particular), as described with reference to FIG. 3 in the first embodiment, can detect five types of errors, and when detecting any of the errors, activates the protective function associated with the error. The types of errors that can be cleared by retrigger are the same as those of the first embodiment. However, contents and output methods of the AS signal are slightly different from those in the battery pack 4 of the first embodiment.

That is, each of the battery pack 61 and 62 (each of the protectors 61*b* and 62*b*, in particular) of the second embodiment, when an operation signal indicating that the trigger switch 58 is turned on is input from the control circuit 70, outputs the AS signal according to presence or absence of an error. Specifically, if an error is not detected, the AS signal indicating normalcy is output, and, if an error is detected, the AS signal indicating that occurrence of an abnormality (AS signal indicating that the detected error is occurring) is output. When the operation signal from the control circuit 70 stops, the output of the AS signal is stopped. That is, in this embodiment, the AS signal is output while the trigger switch 58 is turned on. The contents of the AS signal vary depending on whether an error has been detected.

Each of the battery packs 61 and 62, after detecting an error, when the operation signal is stopped and if the detected error is an error that can be cleared by retrigger, clears an error detected state. Therefore, next time when the operation signal is input again, an AS signal indicating normalcy is output. On the other hand, each of the battery packs 61 and 62, after detecting an error, when the operation signal is stopped and if the detected error is an error that cannot be cleared by retrigger, maintains the error detected state. Therefore, next time when the operation signal is input again, the AS signal indicating occurrence of an abnormality is output again.

The operation unit 66 has a switch to provide/cut off electric connection between the positive electrode of the first battery 61a and the motor drive unit 72. The switch cooperates with the trigger switch 58. Specifically, the operation unit 66 electrically connects the first battery 61 and the motor drive unit 72 when the trigger switch 58 is operated (turned on) and a built-in switch is turned on. The operation unit 66 cuts off connection between the first battery 61 and the motor drive unit 72 when the operation of the trigger switch 58 is stopped (turned off) and the built-in switch is turned off.

A switch signal indicating an on/off state of the switch in the operation unit 66 (that is, an on/off state of the trigger switch 58) and an operation amount of the trigger switch 58 is output to the control circuit 70 from the operation unit 66.

The control circuit 70 receives electric power from each of the batteries 61a and 62a to operate, and controls driving of the motor 64 in accordance with a switching signal from the operation unit 66. In the control circuit 70, the motor drive unit 72 drives the motor 64 by power supply from each of the batteries 61a and 62a to the motor 64 in accordance with a drive command from the MCU 71.

The regulator 73 receives electric power from each of the batteries 61a and 62a to generate a control voltage for operating each unit in the control circuit 70. The MCU 71 operates with the control voltage from the regulator 73 as a power source.

The current detector 74 detects a value of a current flowing to the negative electrode of the second battery 62a from the motor 64 through the motor drive unit 72 and outputs to the MCU 71 a current detection signal indicating the value of the detected current.

The voltage detector 75 detects a value of a voltage of a series connection of the batteries 61a and 62a (hereinafter simply referred to as "battery voltage"), and outputs to the MCU 71 a voltage detection signal indicating the value of the detected battery voltage.

The temperature detector 76 detects a temperature of the control circuit 70, and outputs to the MCU 71 a temperature detection signal indicating the detected temperature.

The AS signal output from the first battery pack 61 is input to the first AS detector 77. The first AS detector 77 outputs information indicated by the AS signal to the MCU 71. The AS signal output from the second battery pack 62 is input to the second AS detector 78. The second AS detector 78 outputs information indicated by the AS signal to the MCU 71.

The operation signal output unit 79, in accordance with an output command from the MCU 71, outputs to the battery pack 61 an operation signal indicating that the trigger switch 58 is turned on. That is, the operation signal output unit 79 outputs an operation signal when the trigger switch 58 is turned on.

In this embodiment, when the AS signal indicating occurrence of abnormality is input while the trigger switch 58 is turned on, an operation signal is output again after the output of the operation signal is temporarily stopped. That is, the MCU 71 outputs a signal indicating that the trigger switch 58 is once turned off and is turned on again although the trigger switch 58 is actually on, thereby to confirm whether the AS signal indicating occurrence of abnormality is subsequently input, that is, whether an error that cannot be cleared by retrigger is occurring. If an error that cannot be cleared by retrigger is occurring, error display similar to that of FIG. 4B is made on the corresponding display unit. An operation to temporarily stop the output of the operation signal and to output the operation signal again as described above is an example of a pseudo-operation process of the present disclosure.

The MCU 71, when the remaining energy display SW 69 is depressed while the trigger switch 58 is turned off, temporarily outputs an operation signal to check the contents of the AS signal from each of the battery packs 61 and 62. When the AS signal indicating occurrence of abnormality is input, the MCU 71 temporarily stops the operation signal and outputs the operation signal again. In other words, although the trigger switch 58 is actually turned off, the MCU 71 output a signal indicating that the trigger switch 58 is turned off and on. Thereby, the MCU 71 confirms whether an error that cannot be cleared by retrigger is occurring to each of the battery packs 61 and 62. If an error that cannot be cleared by retrigger is occurring, error display similar to that of FIG. 4B is made on the corresponding display unit.

The MCU 71 is configured as a known microcomputer comprising at least a CPU, an I/O, an A/D converter, etc. in addition to a memory 71a. The MCU 71, based on each detection signal from the rotation sensor 65 and the current detector 74 provided in the motor 64, controls an electric current to the motor 64 via the motor drive unit 72, so that the motor 64 rotates in accordance with the switching signal from the operation unit 66.

The MCU 71 further has a control circuit protective function. The control circuit protective function is the same as the controller protective function provided in the MCU 11 of the first embodiment (see FIG. 3). That is, the MCU 71 can detect the body overload error, the motor lock error, the body over-discharge error, and a control circuit high temperature error (corresponding to the controller high temperature error). If any of the errors is detected, the MCU 71 activates the corresponding protective function. The types of errors that can be cleared by retrigger are the same as those of the first embodiment.

The MCU 71 further has a function for calculating the remaining energy of each of the battery packs 61 and 62. The MCU 71 periodically calculates the remaining energy and causes each of the display units 67 and 68 to display the calculated remaining energy when the remaining energy display SW 69 is depressed. However, if it is detected that an error that cannot be cleared by retrigger is occurring in either of the battery packs when the remaining energy display SW 69 is depressed, the MCU 71 causes the display unit corresponding to the battery pack to display the error that is occurring rather than the remaining energy of the battery.

Next, a main process performed by the MCU 71 will be described with reference to FIG. 14. The CPU of the MCU 71, when activated, reads and executes a program of the main process stored in the memory 71a of the MCU 71.

The MCU 71, when starting the main process of FIG. 14, determines in S810 whether a predetermined control period has elapsed. The control period referred to herein corresponds to the time base in S110 of the first embodiment (see FIG. 5). Until the predetermined control period elapses, the determination of S810 is repeated. After elapse of the predetermined control period, processes after S820 are executed. In other words, the MCU 71 periodically executes the processes of S820 to S880 at the predetermined control period.

The MCU 71 performs a WDT clear process to clear a watchdog timer (WDT) in S820. In S830, the switch signal from the operation unit 66 is checked. In other words, the operation state of the trigger switch 58 is checked.

In 8840, an AD conversion process to convert various analog signals input to the MCU 71 into digital data is executed. Signals to be AD converted include a signal indicating the operation amount of the trigger switch 58 in the switch signal input from the operation unit 66, various kinds of detection signals input from the current detector 74, the voltage detector 75 and the temperature detector 76, a rotation signal input from the rotation sensor 65, and the like.

In S850, an error detection process is executed. Details about the error detection process will be described later, but a simple outline will be given. In S850, a process to determine whether an error in the battery pack is detected by checking the AS signal from each of the battery packs 61 and 62, a process to determine whether an error is occurring in the appliance main body (control circuit 70), etc. are performed. For the error determination based on the AS signal, a determination on whether an error occurring in the battery pack can be cleared by retrigger is also performed by performing a predetermined process to be described later. If an error that cannot be cleared by retrigger is occurring, a flag indicating occurrence of the error (AS display request flag) is set.

In S860, a motor control process is performed. Specifically, the motor 64 is controlled to be driven in accordance with the operation state of the trigger switch 58. If the above-mentioned error has occurred, the corresponding protective function is activated to forcibly stop power supply to the motor 64 even if the trigger switch 58 is turned on, and maintain the forced stop state until the trigger switch 58 is turned off.

In S870, a storage process is performed. Specifically, if an AS abnormality flag to be described later is set, information indicating that the AS abnormality flag is set, and information related to the AS abnormality flag that is set is stored in the memory 71a. The information related to the AS abnormality flag includes, for example, the type of error in the battery pack that has caused the AS abnormality flag to be set. Various information stored in the memory 71a can be notified or output to the outside by various means.

In S880, a notification process is performed. Details of the notification process will be described later, but a simple outline will be given. In S880, a process is performed, in which, when the AS signal indicating occurrence of abnormality is input from the battery pack or when an error on the appliance main body side is detected, the state is displayed on each of the display units 67 and 68, and the remaining energy of each of the battery packs 61 and 62 is displayed on the corresponding display unit 67 or 68.

The error detection process of S850 will now be described in detail. The error detection process (S850), similar to the error detection process of the first embodiment shown in FIG. 6, comprises the AS detection process, the high-temperature detection process, the voltage drop detection process, and the overload detection process.

In the high temperature detection process, based on the temperature detection signal from the temperature detector 76, it is determined whether the control circuit high temperature error is occurring. When the control circuit high temperature error is occurring, occurrence of the control circuit high temperature error is stored the in the memory 71a. When the control circuit high temperature error is not occurring but information indicating occurrence of the error is stored in the memory 71a, the information is deleted. In the voltage drop detection process, based on the voltage detection signal from the voltage detector 75, it is determined whether the body over-discharge error is occurring. In the overload detection process, based on the current detection signal from the current detector 74, it is determined whether the body overload error is occurring.

Figure 15B:
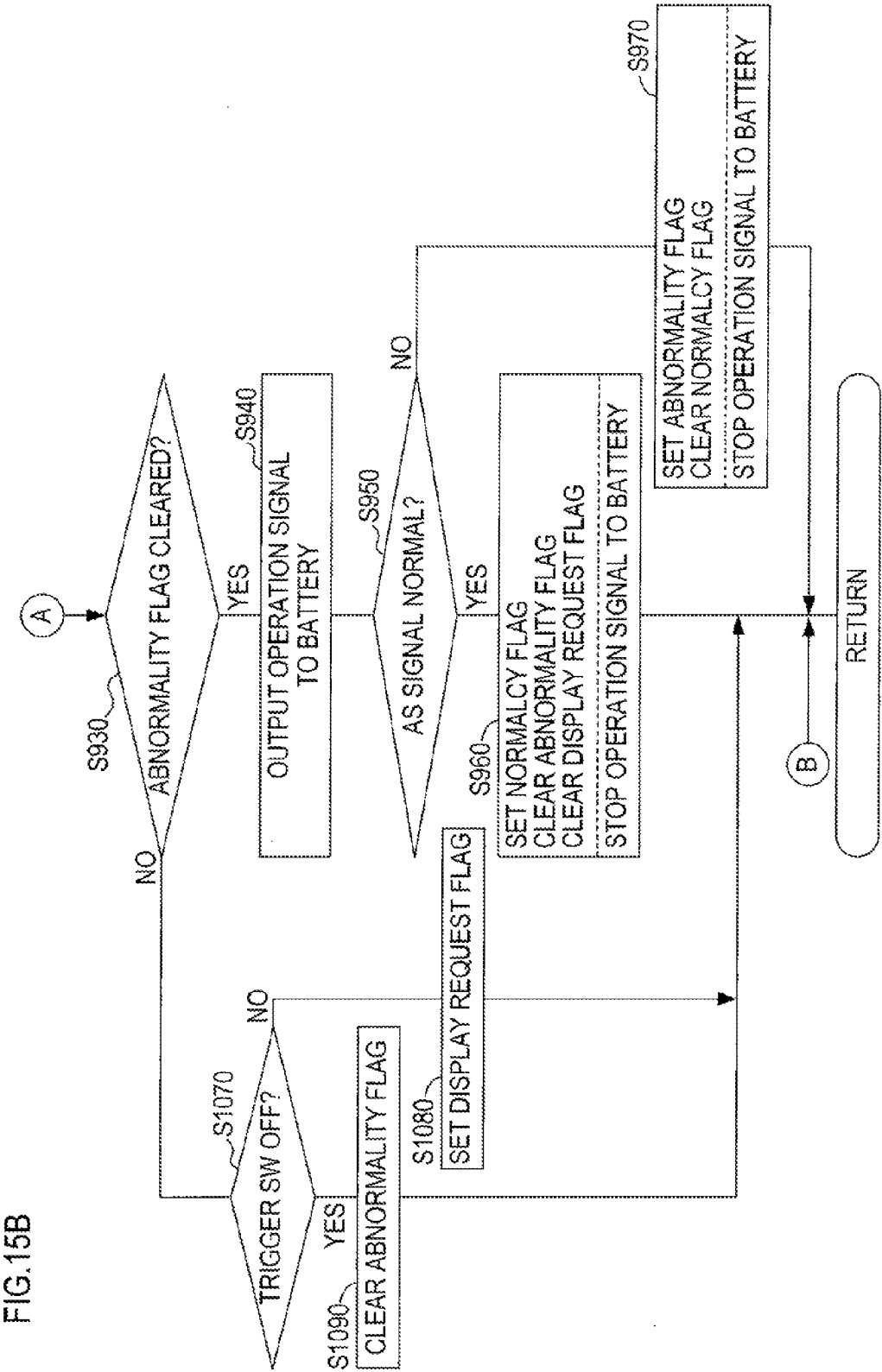

Of the four processes performed in the error detection process (S850), details of the AS detection process are shown in FIGS. 15A and 15B. Any flag that is set or cleared in the AS detection process has been cleared in its initial state.

The MCU 71, when starting the AS detection process of FIGS. 15A and 15B, determines in S910 whether a temporary AS abnormality flag is set. If the temporary AS abnormality flag is not set (is cleared), it is determined in S920 whether an AS normalcy flag is cleared. If the AS normalcy flag is cleared, it is determined in S930 whether the AS abnormality flag is cleared. If the AS abnormality flag is cleared, an operation signal is output to each of the battery packs 61 and 62 in S940. Thereby, an AS signal is input from each of the battery packs 61 and 62. An AS signal indicating normalcy is input when no error is detected in the battery pack. An AS signal indicating occurrence of abnormality is input when an error is detected in the battery pack.

In S950, it is determined whether the AS signal input from each of the battery packs 61 and 62 is the AS signal indicating normalcy. The target AS signal is not the AS signal at a certain moment but the AS signal acquired through a filter. Each of the AS detectors 77 and 78 has a filter for removing noise components from the AS signal input from the corresponding battery pack. From each of the AS detectors 77 and 78, the AS signal from which noise components are cleared through the filter is input to the MCU 71. The MCU 71, based on the filtered AS signal, performs a determination process of S950. The same applies to a determination process of S1020 to be described below.

As a result of the determination in S950, if the input AS signal indicates normalcy, the process proceeds to S960. If the input AS signal indicates occurrence of abnormality, the process proceeds to S970.

In S960, the AS normalcy flag is set as well as the AS abnormality flag and the AS display request flag are cleared. In addition, the operation signal to each of the battery packs 61 and 62 is stopped. If the operation signal is stopped, the input of the AS signal from each of the battery packs 61 and 62 is stopped.

In S970, the AS abnormality flag is set as well as the AS normalcy flag is cleared. In addition, the operation signal to each of the battery packs 61 and 62 is stopped.

When the process of S960 is performed after the AS detection process is started, the AS normalcy flag is set. Thereby, it is negatively determined in the next determination process of S920 and the process proceeds to S980. On the other hand, when the process of S970 is performed, the AS normalcy flag cleared and the AS abnormality flag is set. Thereby, it is negatively determined in the next determination process of S930 and the process proceeds to S1070.

If the AS normalcy flag is set in S920, it is determined in S980 whether the trigger switch 58 is pulled (that is, whether it is turned on). If the trigger switch 58 is not pulled, it is determined in S990 whether the remaining energy display SW 69 is depressed. If the remaining energy display SW 69 is not depressed, the operation signal to each of the battery packs 61 and 62 is stopped in S1000. If the operating signal is already stopped, the state is maintained.

If the trigger switch 58 is pulled in S980 or the remaining energy display SW 69 is depressed in S990, the operation signal is output to each of the battery packs 61 and 62 in S1010. Thus, the AS signal is input to the MCU 71 from each of the battery packs 61 and 62. The process of S1010 executed after affirmative determination in S990 can be said to be a process of outputting a signal indicating that the trigger switch 58 is turned on to each of the battery packs 61 and 62, although the trigger switch 58 is actually turned off.

In S1020, it is determined whether the AS signal input from each of the battery packs 61 and 62 is the AS signal indicating normalcy. If the AS signal indicates normalcy, the process proceeds to S1030. If the AS signal indicates occurrence of abnormality, the process proceeds to S1040.

In S1030, the AS normalcy flag is set. In S1040, both the AS normalcy flag and the AS abnormality flag are cleared, and the temporary AS abnormal flag is set. In addition, the operation signal to each of the battery packs 61 and 62 is stopped.

Although an error has not occurred in each of the battery packs 61 and 62 immediately after starting, an error then occurs, and the trigger switch 58 is pulled or the remaining energy display SW 69 is depressed after occurrence of the error. In that case, in order to confirm whether the error is an error that can be cleared by retrigger, the process of S1040 is performed. The process of S1040 can be said to be a process of notifying that the trigger switch 58 is turned off to each of the battery packs 61 and 62, regardless of the actual operating state of the trigger switch 58. Each of the battery packs 61 and 62, even if it detects an error, clears a detection state of the error if the detected error is an error that can be cleared by retrigger, when the operation signal is stopped.

If the determination process of S910 is performed after the process of S1040 is executed and the temporary AS abnormal flag is set, the process proceed to S1050. In S1050, it is determined whether a predetermined time has elapsed since the temporary AS abnormal flag is set. The AS detection process is ended if the predetermined time has not yet elapsed. If the predetermined time has elapsed, the temporary AS abnormal flag is cleared in S1060.

After the process of S1040, when the AS abnormal temporary flag is cleared in S1060 due to elapse of the predetermined time, it is affirmatively determined in S930 and the process proceeds to S940 in the AS detection process to be executed next. In this case, since the operation signal is output, each of the battery packs 61 and 62 acknowledges that the trigger switch 58 is turned on. Therefore, from each of the battery packs 61 and 62, the AS signal indicating the error detection state at that time is input. At this time, if that error that has occurred at the last minute in the battery pack 61, 62 is the error that can be cleared by retrigger, the AS signal indicating normalcy is input. Thus, the process of S960 is performed. On the other hand, if the error that has occurred at the last minute in the battery pack 61, 62 is the error that cannot be cleared by retrigger, the AS signal indicating occurrence of abnormality is again input. Thus, the process of S970 is performed. That is, the AS abnormality flag is set, and the MCU 71 acknowledges that an error that cannot be cleared by retrigger is occurring in either of the battery packs. When the AS abnormality flag is set in S970 and the AS normalcy flag is cleared, it is negatively determined in S930 in the AS detection process to be executed next, and the process proceeds to S1070.

In S1070, it is determined whether the trigger switch 58 is turned off. If the trigger switch 58 is turned on, the AS display request flag is set in S1080. In S1070, if the trigger switch 58 is turned off, the AS abnormality flag is cleared in S1090.

Now, the notification process in S880 (FIG. 14) will be described in detail with reference to FIG. 16. The MCU 71, when proceeding to the notification process in FIG. 16, determines in S1110 whether the remaining energy display SW 69 is depressed. If the remaining energy display SW 69 is depressed, the process proceeds to the display process of S1120. If the remaining energy display SW 69 is not depressed, the process proceeds to S1130.

In S1130, it is determined whether a predetermined time has elapsed since the remaining energy display SW 69 is released (i.e., since the depressed state is cleared). If the predetermined time has not yet elapsed since when the remaining energy display SW 69 is released, the process proceeds to a display process of S1120. If the predetermined time has elapsed since the remaining energy display SW 69 is released, the process proceeds to S1140.

In S1140, it is determined whether the trigger switch 58 is turned on. If the trigger switch 58 is turned off, it is determined in S1170 whether a predetermined time has elapsed since the trigger switch 58 is turned off. If the predetermined time has not yet elapsed after the trigger switch 58 is turned off, the process proceeds to S1150. If the predetermined time has elapsed after the trigger switch 58 is turned off, the process proceeds to S1180.

In S1180, a non-display process is performed. Specifically, each of the display units 67 and 68 is turned off so that no information is displayed on each of the display units 67 and 68.

If the trigger switch 58 is turned on in S1140, it is determined in S1150 whether the AS display request flag is set. If the AS display request flag is set, the process proceeds to the display process of S1120. The state in which the AS display request flag is set corresponds to a state where an error that cannot be cleared by retrigger is occurring in either of the battery packs. If the AS display request flag is cleared, the process proceeds to S1160.

In S1160, it is determined whether the control circuit high temperature error is detected. The control circuit high temperature error, as described above, is an error that is detected by the MCU 71 based on the temperature detection signal from the temperature detector 76, and that cannot be cleared by retrigger. If the control circuit high temperature error is detected, the process proceeds to the display process of S1120. When the control circuit high temperature error is not detected, the non-display process is performed in S1180.

In the display process of S1120, various information are displayed on each of the display units 67 and 68. Specifically, three LEDs provided in each of the display units 67 and 68 are lit in a display pattern (see FIGS. 4A-4C) corresponding to the information to be displayed for a certain time.

For example, if the AS display request flag is not set and also the control circuit high temperature error is not detected, that is, if an error that cannot be cleared by retrigger is not detected in the appliance 50 as a whole, each of the display units 67 and 68 displays the remaining energy of the corresponding battery pack.

On the other hand, when the AS display request flag is set, an error message as illustrated in FIG. 4B is displayed. If an error which cannot be cleared by retrigger occurs only in one of the battery packs, error display may be made only on the display unit corresponding to the battery pack in which the error is occurring, or error display may be made in both of the display units 67 and 68. Remaining energy display time and error display time can be appropriately determined. Both may be the same time, or may be different time. For example, the error display time may be set longer than the remaining energy display time.

When the control circuit high temperature error is detected, an error message is displayed as illustrated in FIG. 4C. In this case, error display may be made only on one of the display units, or may be made on both of the display units 67 and 68.

If the AS display request flag is set and the control circuit high temperature error is detected, what error is displayed on each of the display units 67 and 68 can be appropriately determined. For example, if an error that cannot be cleared by retrigger is occurring only in one of the battery packs, the display unit corresponding to the battery pack where the error is occurring may make error display as illustrated in FIG. 4B, and the other display unit may make error display indicating the control circuit high temperature error as illustrated in FIG. 4C. Moreover, for example, error display indicating an error of the battery pack side and error display indicating the control circuit high temperature error may be alternately switched at predetermined time intervals.

According to the appliance 50 of the second embodiment described above, similar to the appliance 1 of the first embodiment, if an error occurs in the appliance 50, and the error is an error that cannot be cleared by retrigger, error notification is performed. Therefore, the user can learn exactly if an error that cannot be cleared by retrigger occurs. On the other hand, since occurrence of an error that can be cleared by retrigger is not notified, it is possible to provide the appliance 50 easy to use for the user.

Also, in the appliance 50 of the second embodiment, if an error occurs when the trigger switch 58 is turned on, it is determined whether the error that has occurred can be cleared by retrigger even in a state that the user has turned on the trigger switch 58.

More specifically, although the trigger switch 58 actually remains turned on, a signal indicating that the trigger switch 58 is turned off and is then turned on again is output. Thus, if the error that has occurred is an error that can be cleared by retrigger, error display is not made since the error is to be cleared. On the other hand, if the error that has occurred is an error that cannot be cleared by retrigger, an error state continues even after the output of the signal indicating the off/on of the trigger switch 58. Thus, error display is made. Therefore, if an error that cannot be cleared by retrigger occurs, the user of the appliance 50 can certainly acknowledge that the error has occurred even if the trigger switch 58 remains turned on.

Also, in the appliance 50 of the second embodiment, when the AS detection process in FIGS. 15A and 15B is first performed after the MCU 71 is started, and if an error that cannot be cleared by retrigger is already occurring (specifically if the AS signal indicating abnormality is input), the AS abnormality flag is set (S970). Thereby, the AS display request flag is set (S1080), and error display is made (moving from S1150 to S1120 in FIG. 16). Therefore, if an error is already occurring in the battery pack, the user can learn occurrence of the error quickly when the battery pack is attached to the appliance main body 59.

Other Embodiments (1) The types of detectable errors in the battery pack are not limited to the five errors illustrated in FIG. 3. The types of detectable errors in the appliance main body are also not limited to the four types of errors illustrated in FIG. 3. Whether each of the detectable errors is an error that can be cleared by retrigger can be appropriately determined in consideration of the nature and influence of each error.

(2) In the above embodiment, error detection is performed in both the battery pack and the appliance main body, and error display is made if an error that cannot be cleared by retrigger is detected at least in one of battery pack and the appliance main body. However, error detection may be performed only in either of the battery pack and the appliance main body.

(3) Various display examples shown in FIGS. 4A-4C are merely examples. A specific display method (lighting pattern) of the various kinds of information such as the battery remaining energy and error display can be appropriately determined. To constitute the display unit by three LEDs is also only an example. A display unit of specifically what configuration to be used can be appropriately determined.

That is, the display method corresponding to the specific configuration of the display unit and the information to be displayed on display unit can be appropriately determined.

(4) It is not essential to share the same display unit for error display and display of the remaining energy. Apart from the display unit for displaying the remaining energy, a display unit for error display may be provided.

(5) In the above embodiments, when an error is detected, occurrence of the error is notified to the user by the display on the display unit. Specifically what process to be performed if an error is detected can be appropriately determined. For example, the error detection may be notified to the outside by communication, or may be stored in a memory so as to be read out later.

(6) In the above embodiments, an example in which the present disclosure is applied to a motor driven appliance provided with a trigger switch is shown. It is possible to apply the present disclosure to a motor driven appliance configured to drive elements of the appliance by a so-called lock-on switch (e.g., slide switch). The lock-on switch maintains an on state even if the user releases the switch.

In the motor driven appliance provided with a lock-on switch, when the remaining energy of the battery drops while the appliance is operated with the lock-on switch turned on, operation of the appliance stops. In this case, it is conceivable that the user may once remove the battery pack to be charged, and again attach the battery pack. However, if the battery pack is attached in a state that the lock-on switch is left turned on, there is a fear that the appliance begins to move suddenly at the moment attached. Therefore, in many cases, the motor driven appliance provided with a lock-on switch has a protective function to suppress the appliance from operating when the battery pack is attached in a state in which the lock-on switch is turned on. Attachment of the battery pack to the appliance in a state in which the lock-on switch is turned on can be considered as a kind of error. In that case, it is possible to notify the error to the user by causing the display unit to perform a predetermined display. However, this error can be cleared if the user once turns off the lock-on switch and turns it on again. In other words, this can be said to be one of the errors that can be cleared by retrigger. Therefore, the appliance may be configured such that the protective function is activated but error display is not made, when the battery pack is attached to the appliance in a state in which the lock-on switch is turned on.

(7) In the first embodiment, the display unit 9 may be provided in the battery pack. In the second embodiment as well, each of the display units 67 and 68 may be provided in the corresponding battery pack. In that case, the remaining energy display button may be provided in the appliance main body 59, or may be provided to each of the battery packs.

Also, if the display unit and the remaining energy display button are provided in the battery pack, the appliance may be configured as follows. That is, the battery pack may be configured, if an error is occurring when the remaining energy display button is depressed, to cause the display unit to display the occurrence of the error alone.

Specifically, in the first embodiment, some of the functions of the controller 10 of the appliance main body may be in the battery pack 4. In that case, information notification (e.g., notification of the operation state of the trigger switch 21) from the controller 10 to the battery pack 4 may be performed, if necessary. In the second embodiment, some of the functions of the control circuit 70 may be in each of the battery packs 61 and 62.

(8) In the above embodiments, the MCU is configured as a microcomputer. The MCU may be formed by combining separate various electronic components, may be an ASIC (Application Specified Integrated Circuit), may be a programmable logic device such as a FPGA (Field Programmable Gate Array), or may be a combination thereof.

(9) In the above embodiments, both the motors M1 and 64 are 3-phase brushless motor. These motors may be motors in other forms, such as a brush DC motor, an AC (alternate current) motor, a stepping motor or a linear motor.

(10) Each of the above embodiments shows an example of applying the present disclosure to a rechargeable driver drill and a rechargeable grass mower. The motor driven appliance to which the present disclosure can apply is not limited to those of the above embodiments. It is possible to apply the present disclosure to various motor driven appliances driven by a battery such as a rechargeable impact driver, a rechargeable impact wrench, a rechargeable grinder, a rechargeable circular saw, a rechargeable reciprocating saw, and so on.

The number of battery packs that can be attached to the appliance main body is not particularly limited. The present disclosure is even applicable to a motor driven appliance to which three or more battery packs can be attached. Also, it is not essential that the battery pack is detachable from the appliance main body. It is possible to apply the present disclosure to a motor driven appliance with a built-in battery.

(11) In the first embodiment, the Hall sensor is used as the rotation position detector 25 for detecting the rotation state of the motor. The Hall sensor is, more specifically, a sensor of open collector output, and outputs a two-value pulse signal of H (open) level or L level in accordance with the rotation position.

Figure 17A:
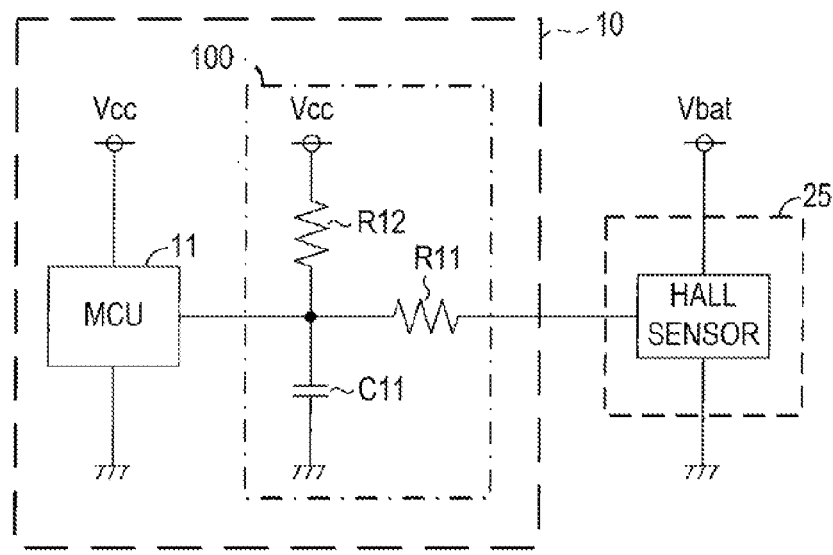
FIG. 17A is a circuit diagram showing a conventional signal input circuit.

FIG. 2 shows that the rotation signal (pulse signal) from the Hall sensor is input to the MCU 11 in the controller 10. However, in fact, the pulse signal from the Hall sensor is input to the MCU 11 through a not shown signal processing circuit. To process a pulse signal from the Hall sensor in various signal processing circuits and input the processed signal to a subsequent circuit (e.g., an A/D converter in the microcomputer) is a common technique as described in, for example, Japanese Unexamined Patent Application Publication No. 2006-189321 and No. 2013-117473. FIG. 17A shows an example of a common signal processing circuit 100 (hereinafter referred to as "old circuit 100").

The old circuit 100 of FIG. 17A comprises a resistor R11, a resistor R12, and a capacitor C11. One end of the resistor R11 is connected to a signal output terminal (more specifically, a signal output terminal of a Hall sensor) of the rotation position detector 25, the other end of the resistor R11 is connected to a signal input terminal of the MCU 11. One end of the resistor R12 is connected to a control voltage line to which the control voltage Vcc is supplied, the other end of the resistor R12 is connected to the signal input terminal of the MCU 11. One end of the capacitor C11 is connected to the ground line, and the other end of the capacitor C11 is connected to the signal input terminal of the MCU 11.

The resistor R12 is a pull-up resistor for pulling up the signal output terminal of the Hall sensor. The resistor R11 and the capacitor C11 constitute a low pass filter for removing high frequency noise components from the signal input from the rotation position detector 25 to the MCU 11.

As shown in FIG. 17A, in a configuration in which the rotation signal from the rotation position detector 25 is input to the MCU 11 via the old circuit 100, a rise of the input signal (rotation signal) to the MCU 11 becomes slow due to a time constant of the low-pass filter. Detection time lag of the rise of the rotation signal occurs in the MCU 11.

Specifically, as indicated by a broken line in FIG. 18, when the output terminal of the rotation position detector 25 is changed to H level (open state) at the time of 0 [ns], the level of the input signal input to the MCU 11 through the old circuit 100 does not immediately reach the control voltage Vcc, and gradually increases. At the time close to 10000 [ns], the level of the input signal reaches a threshold that allows to detect a change in signal level in the MCU 11. That is, time delay (detection error) close to 10000 [ns] occurs from when the output terminal of the rotation position detector 25 changes to H level until the change is detected by the MCU 11. This time delay is not preferred, of course. In particular, the higher a rotation speed of the motor, the greater a problem of time delay becomes. It is possible that control accuracy of the motor is reduced.

Figure 17B:
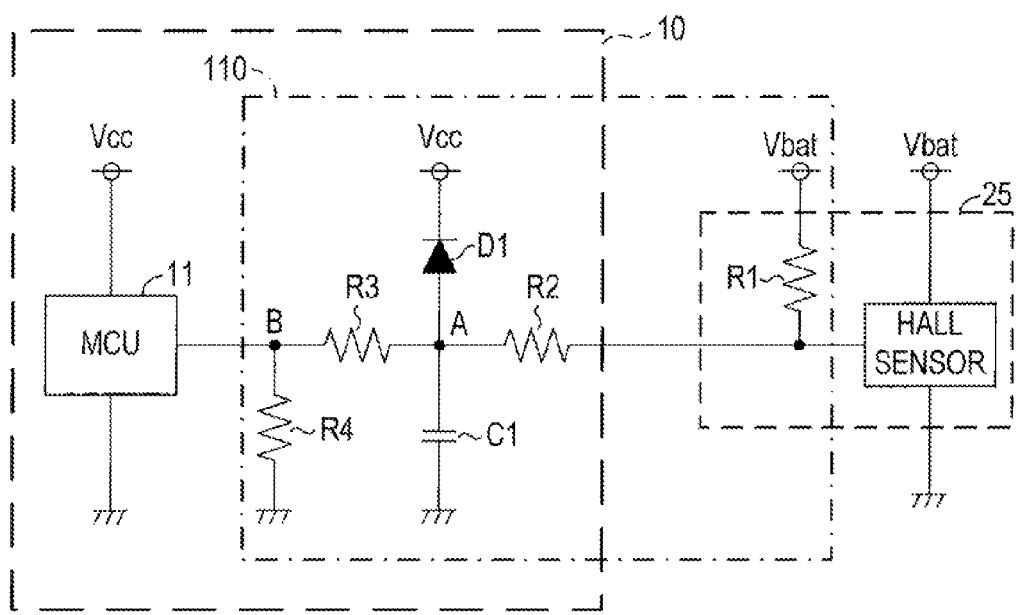
FIG. 17B is a circuit diagram showing a signal input circuit in the motor driven appliance of the first embodiment.

Therefore, in the first embodiment, as a signal processing circuit, a signal processing circuit 110 (hereinafter also referred to as "new circuit 110") as shown in FIG. 17B may be provided. The new circuit 110 shown in FIG. 17B comprises a resistor R1 as a pull-up resistor, a resistor R2, a capacitor C1, a diode D1, a resistor R3, and a resistor R4.

Among the constituent components of the new circuit 110, the resistor R1 is incorporated in the rotation position detector 25. The resistor R1 has one end connected to the signal output terminal of the Hall sensor and the other end connected to a battery voltage line to which a battery voltage Vbat is supplied.

One end of the resistor R2 is connected to the signal output terminal of the rotation position detector 25 (more specifically, the signal output terminal of the Hall sensor). The other end of the resistor R2 is connected to one end of the capacitor C1, one end of the resistor R3, and an anode of the diode D1. A cathode of the diode D1 is connected to the control voltage line. The other end of the capacitor C1 is connected to the ground line. The other end of the resistor R3 is connected to the signal input terminal of the MCU 11. The resistor R4 has one end connected to the ground line and the other end connected to the signal input terminal of the MCU 11.

The resistor R2 and the capacitor C1 constitute a low-pass filter. The diode D1 is a clamp diode for input protection of the MCU 11. In other words, because a point A in the figure is connected to the control voltage line through the diode D1, the voltage at the point A in the figure, as shown in FIG. 18, is suppressed from exceeding a certain upper limit. The upper limit is determined by the control voltage Vcc and a forward voltage of the diode D1. The upper limit is about 4 V in an example of FIG. 18. If the diodes D1 is not provided, the voltage at the point A in the figure, as shown in FIG. 18 by a two-dot chain line, is likely to increase well beyond the upper limit.

If the voltage at the point A in the figure is within a range of acceptable input voltage of the MCU 11 (for example, not more than the power supply voltage Vcc), the voltage may be input to the MCU 11 as an input signal. However, in this example, the voltage at the point A is higher than the control voltage Vcc by at least the forward voltage of the diode D1.

Therefore, in the new circuit 110, the voltage at the point A is divided by a voltage dividing circuit comprised of the input resistor R3 and the resistor R4 and then input to the MCU 11. Therefore, the voltage input to the MCU 11 (i.e., voltage at a point B in the figure), as shown in FIG. 18, becomes lower than the voltage at the point A. In the present embodiment, the voltage at the point B in the figure is about 3.1 V. Although a partial pressure ratio can be appropriately determined, it is preferable to determine the partial pressure ratio such that at least the level of the input signal is not more than the control voltage Vcc which is a power source voltage of the MCU 11.

As above, in the new circuit 110, the resistor R1 which is a pull-up resistor is connected to the battery voltage line having a voltage higher than that of the control voltage line. That is, the signal output terminal of the Hall sensor is pulled up to a higher voltage. Since the pull-up resistor is connected to a higher voltage line, rise time delay of the input signal to the MCU 11 is improved, as compared with the old circuit 100. Specifically, as shown in FIG. 18, the level of the input signal is above a threshold at around 1000 [ns]. Detection error is significantly improved as compared to the old circuit.

From the configuration of inputting the output signal of the Hall sensor to the MCU 11 through the new circuit 110, as shown in FIG. 17B, a technical idea as follows is understood.

(A) A motor control device comprising:

a rotation signal output unit that outputs a rotation signal corresponding to a rotation position of a motor;

a power applying unit that is connected to an output terminal of the rotation signal in the rotation signal output unit and that can apply a predetermined first power supply voltage to the output terminal;

a filter unit that removes high frequency components from the rotation signal output from the output terminal and smoothes the rotation signal; and a control unit that controls the motor by using the input rotation signal smoothed by the filter unit, and, the first power supply voltage that the power applying unit can apply to the output terminal being higher than a second power supply voltage supplied to the control unit for its operation.

According to the motor control device having such a configuration, the output terminal of the rotation signal output unit is pulled up by the power applying unit to a voltage higher than the power supply voltage of the control unit. Therefore, it is possible to accelerate the rise of the rotation signal input to the control unit through the filter unit, and it is also possible to suppress detection delay of the change (especially, the rise) in rotation signal in the control unit. Thus, it is possible to precisely control the device even upon rotating the motor at high speed.

A specific configuration of the filter unit can be variously considered. For example, the filter unit may comprise a resistor provided on a transmission path of the rotation signal to the control unit from the rotation signal output unit, and means (e.g., capacitor) for suppressing voltage variation of the rotation signal. According to the above configuration, even when noise such as static electricity is applied to the rotation signal, it is possible to reduce an amount of current to the control unit while applying filtering for removing high frequency components, and to suitably protect the signal input terminal of the control unit from noise, etc.

(b) In the above (a), the motor control device further comprises a battery that supplies to the motor electric power for rotating the motor, wherein the power applying unit uses a battery voltage supplied from the battery as the first power supply voltage.

According to the motor control device configured in this way, since the battery voltage is used as the first power supply voltage, a device such as a regulator for generating the first power supply voltage is not required. It is possible to simplify the power applying unit.

(c) in the above (a) or (b), the motor control device further comprises a voltage limiting unit that suppresses a voltage of the signal input terminal to which the rotation signal is input in the control unit from exceeding a predetermined voltage limit value.

According to the motor control device configured as above, it is possible to suppress an excessive voltage from being input to the signal input terminal of the control unit by providing the voltage limiting unit. In other words, the voltage input to the signal input terminal of the control unit can be suppressed within a range of voltage level permitted in the control unit.

(d) in any one of the above (a) to (c), the motor control device comprises a voltage divider that divides the voltage of the rotation signal smoothed by the filter unit and outputs the divided rotation signal to the controller.

According to the motor control device having such a configuration, the voltage input to the control unit can be reliably suppressed within the range of the voltage level permitted in the control unit. By providing the voltage limiting unit as in the above (c) alone, it is possible to suppress the voltage input to the control unit within the acceptable range. However, depending on the configuration of the voltage limiting unit, sometimes the voltage input to the control unit cannot be suppressed within the acceptable range by the voltage limiting unit alone. In such cases, it is possible to ensure the voltage input to the control unit to be suppressed within the acceptable range by providing a voltage divider.

(12) The present disclosure is not limited to the specific means or structures such as those shown in the above embodiments, and may take a variety of forms without departing from the scope of the disclosure. For example, the function of one component in the above embodiments may be dispersed to a plurality of components, or the functions of a plurality of components may be integrated to the function of a single component. Also, at least a part of the configuration of the above embodiments may be replaced by a well-known configuration having a similar function. It is also possible to omit a part of the configuration of the above embodiments. Also, at least some of the configuration of one of the above embodiments may be added, substituted and the like, to the configuration of another of the above embodiments. Any embodiments included in the technical idea specified by the language of the appended claims are embodiments of the present disclosure.

What is claimed is:

1. A motor driven appliance comprising:
a battery;
a motor driven by electric power of the battery;
at least one switch comprising an trigger switch for driving the motor, the trigger switch operating a driving switch and a power switch to thereby control output of battery voltage from the battery;
a control unit configured to control driving of the motor by controlling power supply from the battery to the motor when the trigger switch is turned on;
an abnormality detection unit configured to detect an abnormality of the motor driven appliance;
a determination unit configured, when an abnormality is detected by the abnormality detection unit, to perform an abnormality type determination process of determining whether the abnormality is a first type abnormality or a second type abnormality, the first type abnormality being an abnormality, a state of which detected by the abnormality detection unit is cleared when the trigger switch is switched from on to off, and the second type abnormality being an abnormality, a state of which detected by the abnormality detection unit is not cleared just because the trigger switch is switched from on to off; and
a processing unit configured to perform a process when it is determined that the abnormality detected by the abnormality detection unit is the second type abnormality by the determination unit, and not to perform the process when it is determined that the detected abnormality is the first type abnormality.

2. The motor driven appliance according to claim 1, wherein one or more switches of the at least one switch are set to be abnormality confirmation switches, and
wherein the abnormality type determination process comprising a step of, when the one or more of switches set to be the abnormality confirmation switches are turned on and when an abnormality is detected by the abnormality detection unit, determining whether the detected abnormality is the first type abnormality or the second type abnormality.

3. The motor driven appliance according to claim 1, wherein the control unit is configured such that, if an abnormality is detected by the abnormality detection unit when the trigger switch is turned on, the control unit stops power supply from the battery to the motor even if the trigger switch remains turned on.

4. The motor driven appliance according to claim 1, comprising:
an appliance main body, the appliance main body including at least the motor, the control unit, the determination unit, and the processing unit; and
a battery pack configured to accommodate the battery and to be detachably attached to the appliance main body.

5. The motor driven appliance according to claim 2, wherein at least the trigger switch is set to the abnormality confirmation switch, and
wherein the determination unit is configured such that, if an abnormality is detected by the abnormality detection unit when the trigger switch is turned on and the motor is being driven, the determination unit executes the abnormality type determination process while the trigger switch remains turned on.

6. The motor driven appliance according to claim 2,
wherein at least the trigger switch is set to be the abnormality confirmation switch, and
wherein the determination unit is configured such that, if an abnormality is detected by the abnormality detection unit while the trigger switch is turned on and the motor is driven, and when detection of the abnormality continues even after the trigger switch is once turned off and is then turned on again, the determination unit determines that the abnormality is the second type abnormality.

7. The motor driven appliance according to claim 2, further comprising
a display unit configured to display remaining energy of the battery,
wherein the process executed by the processing unit comprises a step of notifying occurrence of the second type abnormality by causing the display unit to display information indicating that the second type abnormality is occurring.

8. The motor driven appliance according to claim 2,
wherein the processing unit is configured such that, when the abnormality confirmation switch is turned on, and when an abnormality is detected by the abnormality detection unit and the determination unit determines that the abnormality is the second type abnormality, the processing unit continues the notification until at least the abnormality confirmation switch is turned off and a predetermined time elapses.

9. The motor driven appliance according to claim 4,
wherein the processing unit is configured to operate by electric power of the battery when the battery pack is attached to the appliance main body,
wherein the abnormality detection unit is at least included in the battery pack, and wherein the processing unit is configured, when started by the battery pack attached to the appliance main body, and when an abnormality is detected by the abnormality detection unit in the battery pack, to execute the process.

10. The motor driven appliance according to claim 5, further comprising
an operation signal output unit configured to output an operation signal indicating an operation state of the trigger switch to the abnormality detection unit,
wherein the abnormality detection unit is configured to output an abnormality detection signal indicating detection of an abnormality, when detecting the abnormality, and then stop the output of the abnormality detection signal, if the detected abnormality is the first type abnormality when the abnormality detection unit acknowledges that the trigger switch is switched from on to off based on the operation signal input from the operation signal output unit, and
wherein the determination unit is configured such that, if an abnormality is detected by the abnormality detection unit while the trigger switch is turned on and the motor is driven, the determination unit executes a pseudo-operation process to cause the operation signal output unit to output an operation signal indicating that the trigger switch is turned off, and then output an operation signal indicating that the trigger switch is turned on again, and, if the abnormality detection signal remains output from the abnormality detection unit even after execution of the pseudo-operation process, the determination unit determines that the abnormality detected by the abnormality detection unit is the second type abnormality.

11. The motor driven appliance according to claim 7, wherein the at least one switch comprises a remaining energy display switch for causing the display unit to display the remaining energy of the battery,
wherein the remaining energy display switch is set as the abnormality confirmation switch,
wherein the processing unit is configured, if the determination unit determines that the second type abnormality is detected when the remaining energy display switch is turned on, to notify occurrence of the second type abnormality.

12. The motor driven appliance according to claim 10, wherein the pseudo-operation process is a process to cause the operation signal output unit to output an operation signal indicating that the trigger switch is turned off and, after a predetermined time, to output an operation signal indicating that the trigger switch is turned on.

* * * * *